(12) United States Patent
Qureshi et al.

(10) Patent No.: US 8,763,089 B2
(45) Date of Patent: Jun. 24, 2014

(54) FLEXIBLE AUTHENTICATION AND AUTHORIZATION MECHANISM

(75) Inventors: Rashid Qureshi, Redmond, WA (US); Anand Muthurajan, Sammamish, WA (US); Jorge Raastroem, Redmond, WA (US); Abolade Gbadegesin, Seattle, WA (US); Jithendra Veeramachaneni, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 553 days.

(21) Appl. No.: 12/686,304

(22) Filed: Jan. 12, 2010

(65) Prior Publication Data

US 2011/0173681 A1 Jul. 14, 2011

(51) Int. Cl.
*H04L 29/06* (2006.01)
*H04W 12/06* (2009.01)
*H04W 4/06* (2009.01)

(52) U.S. Cl.
CPC ............ *H04W 12/06* (2013.01); *H04L 63/0823* (2013.01); *H04W 4/06* (2013.01)
USPC ................... 726/4; 709/206; 709/235

(58) Field of Classification Search
CPC ..... H04L 63/0823; H04W 12/06; H04W 4/06
USPC ............... 726/4; 709/206, 235, 236
See application file for complete search history.

(56) References Cited

U.S. PATENT DOCUMENTS

| | | | |
|---|---|---|---|
| 6,421,781 B1 * | 7/2002 | Fox et al. ........................ 726/4 |
| 6,742,127 B2 * | 5/2004 | Fox et al. ....................... 726/10 |
| 6,980,993 B2 * | 12/2005 | Horvitz et al. ...................... 1/1 |
| 7,356,834 B2 | 4/2008 | Smith |
| 7,512,957 B2 * | 3/2009 | Cohen et al. .................. 719/328 |
| 7,539,747 B2 * | 5/2009 | Lucovsky et al. ............. 709/224 |
| 7,548,932 B2 * | 6/2009 | Horvitz et al. ...................... 1/1 |
| 7,613,702 B2 * | 11/2009 | Horvitz et al. ...................... 1/1 |
| 7,613,721 B2 * | 11/2009 | Horvitz et al. ...................... 1/1 |
| 7,613,722 B2 * | 11/2009 | Horvitz et al. ...................... 1/1 |
| 7,899,476 B2 * | 3/2011 | Cheng et al. .................. 455/466 |
| 7,953,808 B2 * | 5/2011 | Sharp et al. ................... 709/206 |
| 8,099,764 B2 * | 1/2012 | Herzog et al. ..................... 726/4 |
| 8,255,685 B2 * | 8/2012 | Truskovsky et al. .......... 713/156 |

(Continued)

OTHER PUBLICATIONS

Kasai, Hiroyuki; Yamazaki, Kenichi; Kurakake, Shoji; "Adaptive Notification System Guaranteeing Message Reachability", International Conference on Pervasive Services, Jul. 11-14, 2005, pp. 208-217.*

(Continued)

*Primary Examiner* — Victor Lesniewski
(74) *Attorney, Agent, or Firm* — Bryan Webster; Andrew Sanders; Micky Minhas

(57) ABSTRACT

Techniques and tools for flexible authentication and authorization of services on a push framework. For example, a push notification framework allows services (social networking web services, etc.) to use either an authenticated access mode or an unauthenticated access mode, in order to push information to client devices (e.g., mobile devices). In the authenticated mode, the push framework requires registration of the service with the push framework before allowing the service to push notifications to client devices. Different authenticated modes are provided for third-party and first-party services. In the unauthenticated mode, registration is not required, but notifications are throttled, thereby limiting risk of abuse by unauthenticated services. This allows flexibility for services that use the push framework.

19 Claims, 19 Drawing Sheets

(56) References Cited

U.S. PATENT DOCUMENTS

| | | | |
|---|---|---|---|
| 8,316,091 B2* | 11/2012 | Hirvela et al. | 709/206 |
| 8,484,472 B2* | 7/2013 | Sherkin et al. | 713/170 |
| 8,539,553 B2* | 9/2013 | Paas et al. | 726/4 |
| 2003/0072451 A1* | 4/2003 | Pimentel et al. | 380/270 |
| 2003/0135639 A1* | 7/2003 | Marejka et al. | 709/232 |
| 2004/0230661 A1 | 11/2004 | Rashid | |
| 2005/0120214 A1* | 6/2005 | Yeates et al. | 713/171 |
| 2008/0209451 A1* | 8/2008 | Michels et al. | 719/328 |
| 2009/0117877 A1 | 5/2009 | Yang | |
| 2009/0181705 A1 | 7/2009 | Yin | |
| 2009/0222527 A1* | 9/2009 | Arconati et al. | 709/206 |
| 2009/0228566 A1 | 9/2009 | Sharp | |
| 2009/0235349 A1* | 9/2009 | Lai et al. | 726/14 |
| 2010/0077461 A1* | 3/2010 | Nguyen et al. | 726/5 |
| 2011/0077005 A1* | 3/2011 | Bhatt et al. | 455/435.1 |
| 2011/0145699 A1* | 6/2011 | Kheiri et al. | 715/236 |
| 2011/0161659 A1* | 6/2011 | Himawan et al. | 713/156 |

OTHER PUBLICATIONS

Vinoski, Steve; "Web Services Notifications", IEEE Internet Computing, vol. 8, Issue 2, Mar.-Apr. 2004, pp. 86-90.*

Apple Inc., "Apple Push Notification Service Programming Guide, Networking and Internet," Aug. 2009, 38 pages.

Cagle, "From Social to Serious, Combining Twitter and RESTful Web Services," www.devx.com, Mar. 2009, 3 pages.

Hathaway, "Boxcar brings Twitter push notifications to the iPhone," www.downloadsquad.com, Jul. 2009, 1 page.

Mah, "The state of push: Understanding the BlackBerry," www.techrepublic.com, Oct. 2007, 7 pages.

Martin, "iPhone Push Notification waiting in the wings," CNET Reviews, Jun. 2009, 3 pages.

Microsoft Corp., "What is TLS/SSL?," Microsoft TechNet, Mar. 2003, 5 pages.

Microsoft Corp., "Mobile Device Management for Microsoft Windows Mobile 2002 Software for Smartphones and Pocket PCs," Technical White Paper, Jan. 2004, 60 pages.

Open Mobile Alliance, "Content Delivery Working Group," downloaded Jan. 2010, 1 page.

Praher, "Mobile Service Oriented Architecture in the Context of Information Retrieval," Johannes Kepler Universitat—Linz, Jun. 2008, 155 pages.

Sybase Inc., "Extending Enterprise Messaging to Mobile Application with QAnywhere, A Technical Overview," Feb. 2008, Microsoft Corp., 10 pages.

Tosi, "An Advanced Architecture for Push Services," *Proceedings of the Fourth International Conference on Web Information Systems Workshops*, Dec. 2003, 8 pages.

Twitter, Inc., "Rate Limiting," Twitter API Wiki, Apr. 2009-Jan. 2010, 4 pages.

* cited by examiner

FIG. 11

1110 — http://<PrivateIP>/firstParty/01.00/
AAEeCy0tkSX9QqjqKMmFwogHAp04YsQDAQAAAAQUGB
uXcThSDkeyUWeLVBr4qT8Qt4IFDjh8Zj9OVj8_Pz8XDj8

1112 — https://<PublicIP>/unthrottledThirdParty/01.00/
AAHwkcuTb9rUSrKRHOZtwzJZAp04YsQDAQAAAAQUJ8b
Mmj0PNECDtqmmhk4rfLospN8FDj9kPz8_PzRJFy0_Pz8

1114 — http://<PublicIP>/throttledThirdParty/01.00/
AAENx4co1WM3T7bKfFn6bRLlAp04YsQDAQAAAAQU5t3
OaDJtJ0iwpwqleR0RtvBONWUFDj8nPz9RHD8_Pz9LPzYv

FIG. 12

```
       ┌ POST /01.00/
       │ AAENx4co1WM3T7bKfFn6bRL1Ap04YsQDAQAAAAQU5t3OaDJtJOiwpwqleR0RtvBONWUFDj
       │ 8nPz9RHD8_Pz9LPzYv HTTP/1.1
       │ Host: <PublicIP>
1200 ──┤ Content-Type: application/*; charset=UTF-8
       │ Content-Length: 5
       │
       │ Hello
       └
```

FLEXIBLE AUTHENTICATION AND AUTHORIZATION MECHANISM

FIELD

The described technology relates to authentication and authorization for services that deliver information to client devices using a push model.

BACKGROUND

In the mobile domain, a service (e.g., a social networking web service, financial web service, news service, etc.) can push notifications to a corresponding application on a client device (e.g., a smart phone). Often, a mobile platform will act as an intermediary between a service and a client device, and will impose rules or restrictions on how the service communicates with the client device. A communication channel that allows push notifications to be sent from a service to a client device can be referred to as a push channel. A platform that enables a push channel typically requires the device and service to authenticate themselves with the platform. The complexities of device authentication can be hidden from the application by a push client stack on the device. However, the service authentication needs to be handled by the service directly, which results in additional cost and development effort. This makes it difficult for existing services or new services to adapt to the requirements of authentication, resulting in slower adoption of the platform.

Although authentication provides some measure of security, it also can be restrictive. In fact, the utility of many services (e.g., social networking services) depends on openness and ease of communication, which can be restricted by requiring authentication. In addition, for authentication to be reliable, a secure communication protocol is required.

Proxy services can be used to bridge the gap between platform servers that require a secure protocol for client device data transmission, and services that prefer to use more open protocols (such as ordinary, or non-secure, Hypertext Transfer Protocol (HTTP)). In the example shown in FIG. 1, a proxy service 100 enables communication between platform server 110 and service 120 by communicating with platform server 110 via a secure protocol (HTTPS) and communicating with service 120 via ordinary HTTP.

The use of proxy services introduces several problems. One problem is increased latency: the introduction of a proxy service as an intermediary can cause communication delays by introducing additional steps in the process of communication between platform servers and other services. Another problem is that a proxy service will tend to become a bottleneck as another service adds features that it wishes to expose to particular resources on the other side of the proxy service. This is because as new features are added, the proxy service must adapt to allow communications that enable the new features. Use of proxy services also may expose a user to additional security risks, because while the service the user wants to receive notifications from may be reliable, the proxy service may not be.

Representational state transfer, or REST, refers to a set of web services design principles that focus on uniform resource identifiers (URIs), HTTP, and other non-proprietary formats and protocols to provide web services. "RESTful" services employ REST design principles and tend to have less dependence on middleware, instead providing data in a more standard format that is easier for different applications to work with. Examples of RESTful web services include Twitter, Facebook and gMail.

Because of the increasing popularity of REST design in web services, applications that can work effectively with RESTful web services are increasingly desirable.

Whatever the benefits of previous techniques, they do not have the advantages of the techniques and tools presented below.

SUMMARY

Techniques and tools for flexible authentication and authorization on a push framework (e.g., a push notification framework) are described. In several described embodiments, a push notification framework allows services (e.g., a social networking web services, financial web services, news services, etc.) to use the push notification framework either in an authenticated access mode or an unauthenticated access mode, in order to push information to client devices. In the authenticated mode, the push framework requires registration of the service with the push framework before allowing the service to push notifications to client devices. In the unauthenticated mode, registration is not required. This allows flexibility for services that use the push framework.

In one aspect, a push notification framework provides an authenticated mode and an unauthenticated mode to a service. The authenticated mode requires registration of the service with the push notification framework. The unauthenticated mode allows unregistered use of the push notification framework. Unregistered use can be regulated by throttling notification flow (e.g., limiting number of push notifications during a time period or for a particular client device, or a subscription on a client device) from the service. The push notification framework selects between the authenticated mode and the unauthenticated mode based on identifying information provided by the service. The identifying information provided by the service can include a service name. Based at least in part on the selected mode, the push notification framework provides subscription information to the service that permits the service to send push notifications to one or more client devices over a network (e.g., via a push notification framework server). The subscription information can include information (e.g., an IP address) that indicates endpoint (e.g., and HTTP or HTTPS endpoint) for communicating with the push notification framework.

The content of the subscription information can vary depending on whether unauthenticated mode or authenticated mode is selected. For example, if unauthenticated mode is selected, the subscription information can include a front-end HTTP endpoint. For authenticated services, an authenticated third-party service sub-mode or an authenticated internal service sub-mode can be selected, and the subscription information can vary depending on the selected sub-mode. For example, the subscription information can include a front-end HTTPs endpoint if authenticated third-party service sub-mode is selected, or a back-end HTTP endpoint if authenticated internal service sub-mode is selected.

In another aspect, a push framework receives subscription request information from a client device, the subscription request information identifying a service operable to send push notifications over a network to the client device. Based at least in part on the subscription request information, the push framework selects between an unauthenticated communication mode and one or more authenticated communication modes. The push framework provides a subscription token to the client device. For example, the push framework provides the subscription token to a push notification client stack on the client device, which then forward the subscription token to a client application for delivery to the service. The subscription token comprises endpoint information corresponding to the selected communication mode. The endpoint information facilitates sending of push notifications from the service to the client device via the push framework. For example, the endpoint information corresponding to an unauthenticated mode can be an IP address for a front-end HTTP endpoint at a push framework server. The endpoint information corresponding to an authenticated mode can be an IP address for a front-end HTTPS endpoint at a push framework server. For first-party services, the endpoint information can be a private HTTP endpoint that is not accessible by third-party services.

When the selected mode is unauthenticated mode, the push framework can throttle push notifications. For example, the push framework can monitor volume of push notifications sent by the service, determine whether the volume of push notifications sent by the service exceeds a threshold, and, if the threshold is exceeded, prevent subsequent push notifications from being sent to the client device. The threshold can be associated with a time period. For example, the threshold can be a maximum number of push notifications that can be sent by the service to the client device in a day. The push framework can prevent subsequent notifications from being sent by, for example, invalidating the subscription token.

In another aspect, a push notification framework server receives a push notification message (e.g., HTTP POST request containing a push notification and a subscription token) from a service operable to send push notifications to one or more mobile client devices via the push notification framework server. Depending on whether the service is an authenticated service or an unauthenticated service, and whether the service is a first-party service or a third-party service, a communication mode is selected. The communication mode can be an unauthenticated communication mode, an authenticated third-party communication mode or an authenticated first-party communication mode. A decision on whether to throttle push notifications from the service is based at least in part on the selected communication mode.

The foregoing and other objects, features, and advantages of the invention will become more apparent from the following detailed description, which proceeds with reference to the accompanying figures.

BRIEF DESCRIPTION OF THE DRAWINGS

FIG. 11 is a code diagram showing example tokens for an authenticated first party service, an authenticated third party service, and an unauthenticated third party service, according to one or more described embodiments.

FIG. 12 is a code diagram showing an example of an HTTP POST message containing a push notification sent by a third party service, according to one or more described embodiments.

DETAILED DESCRIPTION

Figure 1:
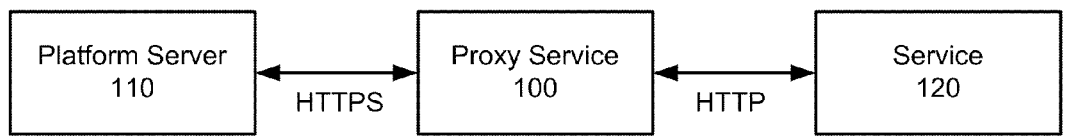
FIG. 1 is a diagram showing a proxy service that enables communication between a platform server and a service according to the prior art.

Described embodiments include various techniques and tools for flexible authentication and authorization on a push framework, which can be a push notification framework. A push framework is a framework (which can be implemented in a computer system) that regulates communications sent from services (e.g., web services implemented on one or more server computers) to client devices (e.g., client wireless devices such as smart phones) according to a push model, where services send information to client devices without the client device making a specific request for the information to be sent. Services and push frameworks typically include one or more server computers that communicate with each other, with client devices and/or with other computer systems.

Sending information according to a push model can be described as "pushing" the information. One type of information that can be sent in a push model of communication is a push notification. A push framework that handles push notifications can be referred to as a push notification framework. In some embodiments, a push notification framework includes a push notification framework (PNF) server and a push notification client stack on one or more client devices (e.g., mobile devices running a Microsoft Windows Mobile operating system). The push notification framework allows a service to push notifications via the PNF server and allows client devices to receive notifications via the push notification client stack on the respective device. Described techniques and tools can be applied to push frameworks generally or push notification frameworks specifically.

A push notification refers to information that "notifies" a client device (or a user of a client device) about some condition. An example of a push notification is a message delivered to a client device to inform a user that available information on a web service (e.g., a social networking web service, a financial web service, or a news service) has been updated. Other examples of push notifications include advertisements, emails or text messages, and announcements about urgent software updates. Notifications may contain specific messages in themselves (e.g., a note from another user on a social networking web site), or they may act as notices of other information (e.g., a video message, voicemail message or email) that is available elsewhere. It should be understood that any number of different types of notifications can be accommodated in described embodiments.

Permitting information to be pushed from services to client devices, while useful, can lead to vulnerabilities. For example, if a service sends too many push notifications to a mobile device in a given time period, the notifications may consume too many computing resources and/or drain the battery of the mobile device. Such an overload could be unintentional (e.g., as a result of a poorly designed application or a mismanaged service) or intentional (e.g., as a result of a denial of service or "DoS" attack on the device).

In several described embodiments, a push framework allows services to use the push framework either in an authenticated access mode or an unauthenticated access mode, in order to push information to client devices. In the authenticated mode, the push framework requires registration of the service with the push framework before allowing the service to push notifications to client devices. Authenticated mode can be used by services that have a deeper integration with the push framework. For example, authenticated mode can be used by services that have already established a "trusted" relationship with the push framework by exchanging identifying information over an encrypted communication channel. Registration can involve different processes and requirements, but generally requires that a push framework be given confirmation of the identity of a service. In the unauthenticated mode, registration is not required. This allows flexibility for services that use the push framework. Described embodiments can make the interface between a push framework and a service flexible enough to allow the service to start using the push framework without requiring the service to comply with authentication mechanisms.

Functionality for monitoring and regulating flow of pushed information is described. For example, push notifications can be throttled (e.g., by limiting the number of push notifications to a particular number over a particular time period, sent to a particular user or device) in an unauthenticated mode. Described embodiments regulate services operating in an unauthenticated mode by throttling pushed information yet also provide one or more authenticated modes, such as for services that would like to push information to client devices without being throttled.

Push Framework with Flexible Authentication and Authorization

Described embodiments of push framework techniques and tools use flexible authentication and authorization.

Authentication refers to a process by which computers or other digital devices can reliably identify each other. Authentication can refer to a general process of confirming identities of devices or to specific instances. For example, authentication is desired in a server-client relationship between Server X and Client Y. During client authentication, Server X gets confirmation that a device claiming to be Client Y is indeed Client Y. During server authentication, Client Y gets confirmation that a device claiming to be Server X is indeed Server X. Such confirmation can be provided in the form of a digital certificate, or in some other form. The issue of whether authentication is performed, the type of authentication to be performed, if any, and how the authentication is to be performed can depend on any of several factors, including the needs or nature of particular transactions, communications, and relationships between servers and devices.

There are different ways to authenticate devices, some of which involve secure data transmission protocols. TLS (Transport Layer Security) and SSL (Secure Socket Layer) are examples of secure data transmission protocols based on public key cryptography. They enable server and client authentication and data encryption across networks. TLS and SSL are two of the protocols that provide secure data transmission over the World Wide Web via the Hypertext Transfer Protocol (HTTP). Secure HTTP (or HTTPS) is one of the most important elements for performing secure transactions over networks such as the Internet.

Authorization refers to the privileges (or lack of privileges) that particular entities have with regard to particular resources. In general, an entity that is authorized to access a particular resource is permitted to access that resource in some way. Authorization is conferred by an authority regarding the privileges and resources that are the subject of the authorization. For example, a push notification framework can act as an authority regarding whether a service can send push notifications to client devices. Authorization can be conditional. For example, authorization to send push notifications to a client device by a particular method can be conditional on registering a service and operating in an authenticated mode. Authorization can be revocable. For example, authorization to send push notifications to a client device can be revoked if a number of push notifications exceeds a threshold during a given time period. Authorization can be limited. For example, authorization to send push notifications to a client device may be limited to particular times of day. Authorization can be considered separately from or in combination with authentication.

Exemplary Push Framework Techniques and Tools

EXAMPLE 1

Figure 2:
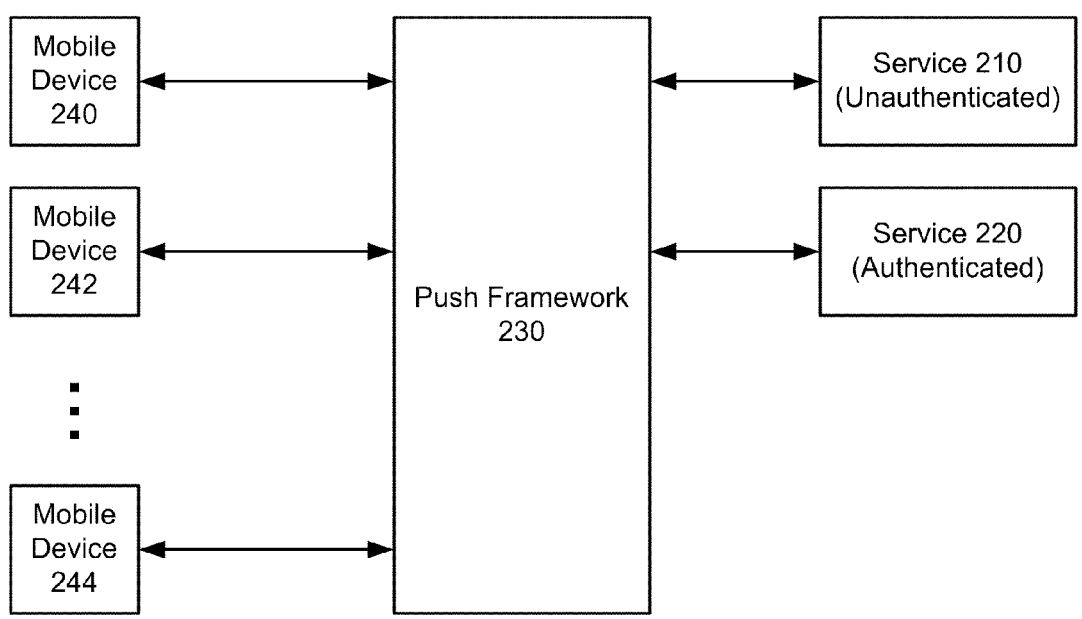
FIG. 2 is a diagram showing an unauthenticated service that communicates with a push framework and an authenticated service that communicates with the push framework, according to one or more described embodiments.

In the example shown in FIG. 2, service 210 is an unauthenticated service that communicates with a push framework 230, and service 220 is an authenticated service that communicates with the push framework 230. The two services 210, 220 can communicate with any number of client devices (e.g., mobile devices 240, 242, 244), and will typically communicate with different subsets of the client devices.

EXAMPLE 2

Figure 3:
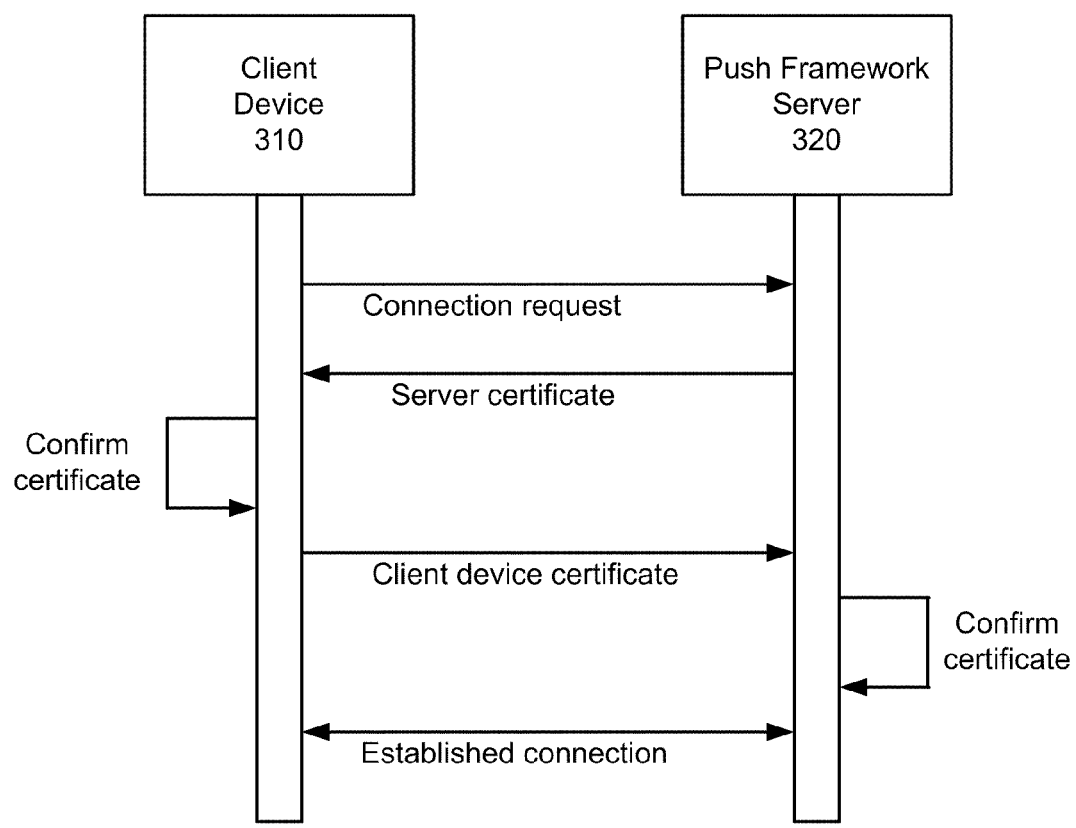
FIG. 3 is a diagram showing a client device having a connection with a push framework server to facilitate receiving pushed information from services, according to one or more described embodiments.

A client device can establish a connection (e.g., a persistent connection) with a push framework server to facilitate receiving pushed information from services. In the example shown in FIG. 3, a client device 310 requests a connection with a push framework server 320. The push framework server 320 responds to the request for connection (in this example, by providing a server certificate). The client device 310 processes the response from the push framework server 320 (in this example, by confirming the server certificate). The client device 310 identifies itself to the push framework server 320 (in this example, by providing a client device certificate). The push framework server 320 processes the identification from the client device 310 (in this example, by confirming the client device certificate). A connection is then established between the client device 310 and the push framework server 320.

EXAMPLE 3

Figure 4:
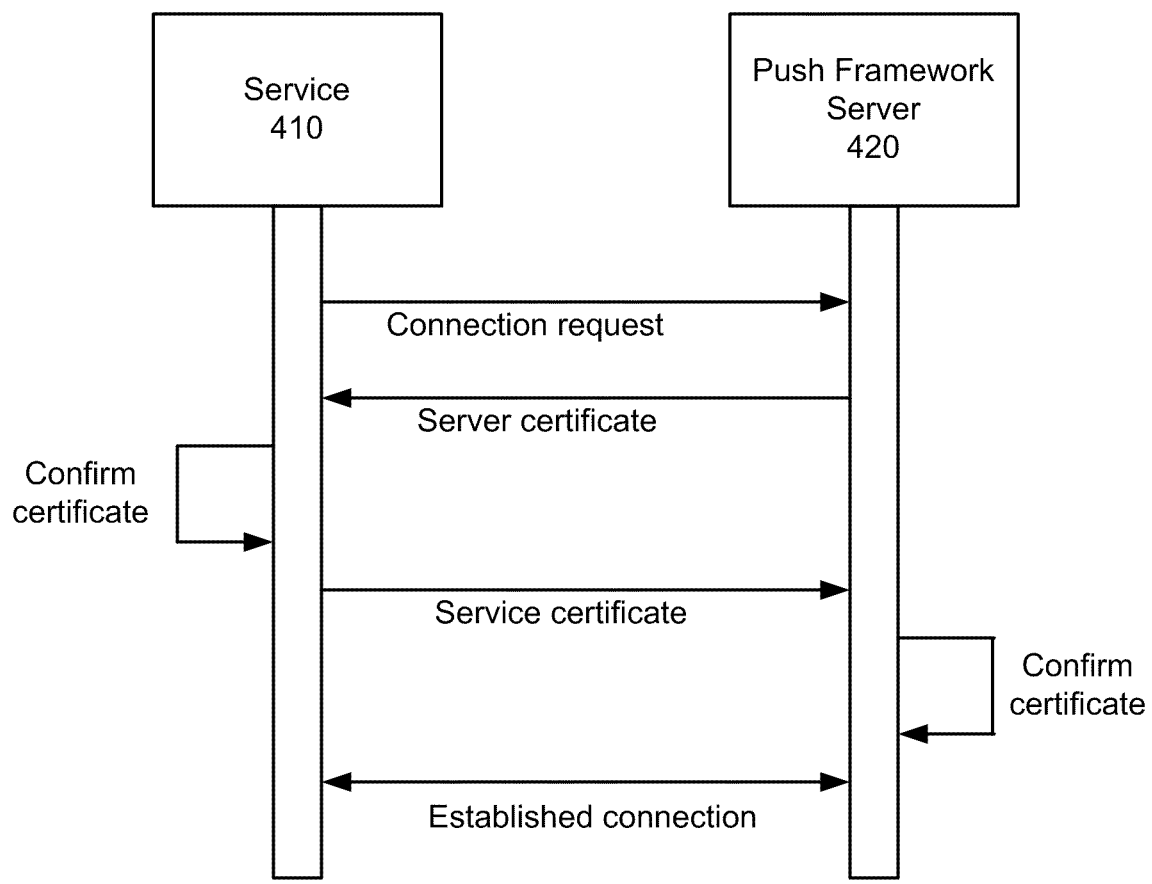
FIG. 4 is a diagram showing a service having a connection with a push framework server to facilitate authentication of the service, according to one or more described embodiments.

A service can establish a connection with a push framework server to facilitate authentication of the service. Authentication can be required by a push framework before the service is allowed to use an authenticated mode provided by the push framework. In the example shown in FIG. 4, a service 410 (e.g., a service that sends push notifications to client devices) requests a connection with a push framework server 420. The push framework server 420 responds to the request for connection (in this example, by providing a server certificate). The service 410 processes the response from the push framework server 420 (in this example, by confirming the server certificate). The service 410 identifies itself to the push framework server 420 (in this example, by providing a service certificate). The push framework server 420 processes the identification from the service (in this example, by confirming the service certificate). For example, the push framework server verifies that the service certificate subject name is registered with the push framework. The connection is then established.

EXAMPLE 4

Figure 5:
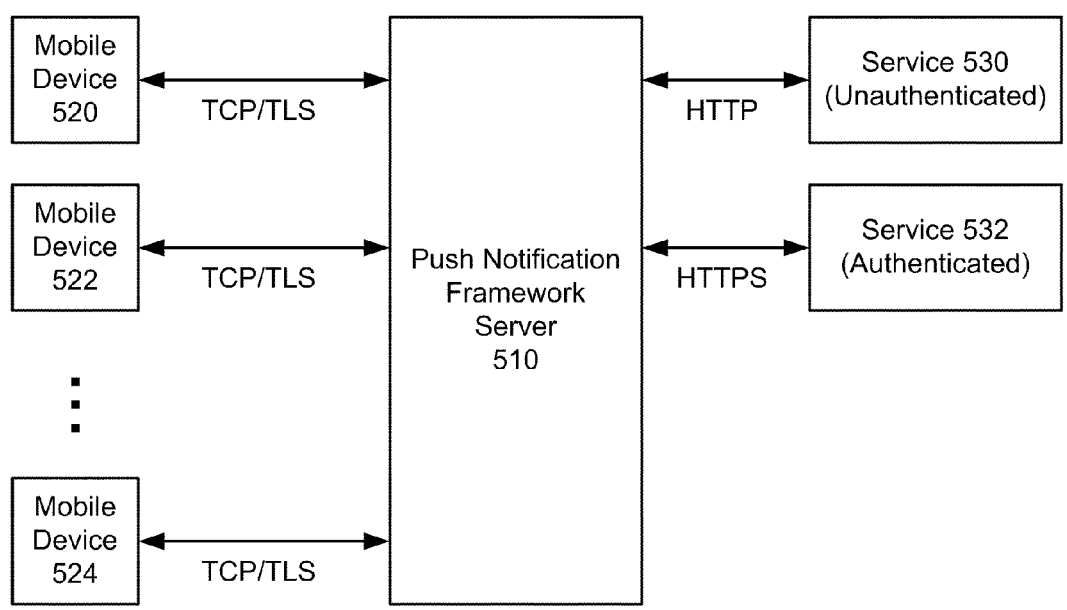
FIG. 5 is a diagram showing an unauthenticated service that communicates with a push notification framework (PNF) server via un-secured HTTP, and an authenticated service that communicates with the PNF server via secure HTTP (HTTPS), according to one or more described embodiments.

In the example shown in FIG. 5, a push notification framework (PNF) establishes secure communication with mobile client devices 520, 522, 524 and regulates services 530, 532 that wish to communicate with the mobile devices 520, 522, 524 via push notifications. The PNF includes PNF server 510 and a push notification client stack (that communicates with the PNF server 510) on the mobile devices 520, 522, 524. Secure communication between the PNF server 510 and the mobile client devices 520, 522, 524 is achieved with a persistent connection to individual mobile devices via TCP (Transmission Control Protocol) using TLS. The choice of TCP as a transport protocol can be useful, for example, when working with devices that include wireless cellular telephone capabilities. TCP is a binary protocol, which helps conserve bandwidth. Text-based protocols such as HTTP would consume more bandwidth in this scenario, but could be useful in situations where bandwidth limitations are less severe.

The PNF provides different modes under which services 530, 532 can operate. Specifically, the PNF provides an authenticated mode for internal or "first party" services (authenticated internal mode), an authenticated mode for external or "third party" services (authenticated third party mode) and an unauthenticated mode. Internal and third party modes can be considered "sub-modes" of an authenticated mode. Depending on the mode a particular service uses (e.g., authenticated internal, authenticated third party, or unauthenticated), the PNF provides a way for the service to communicate with the mobile devices.

In the example shown in FIG. 5, service 530 is an unauthenticated service that communicates with the PNF server 510 via un-secured HTTP, and service 532 is an authenticated service that communicates with the PNF server 510 via secure HTTP (HTTPS). The two services 530, 532 can communicate with any number of client devices (e.g., mobile devices 520, 522, 524), and will typically communicate with different subsets of client devices.

EXAMPLE 5

Figure 6:
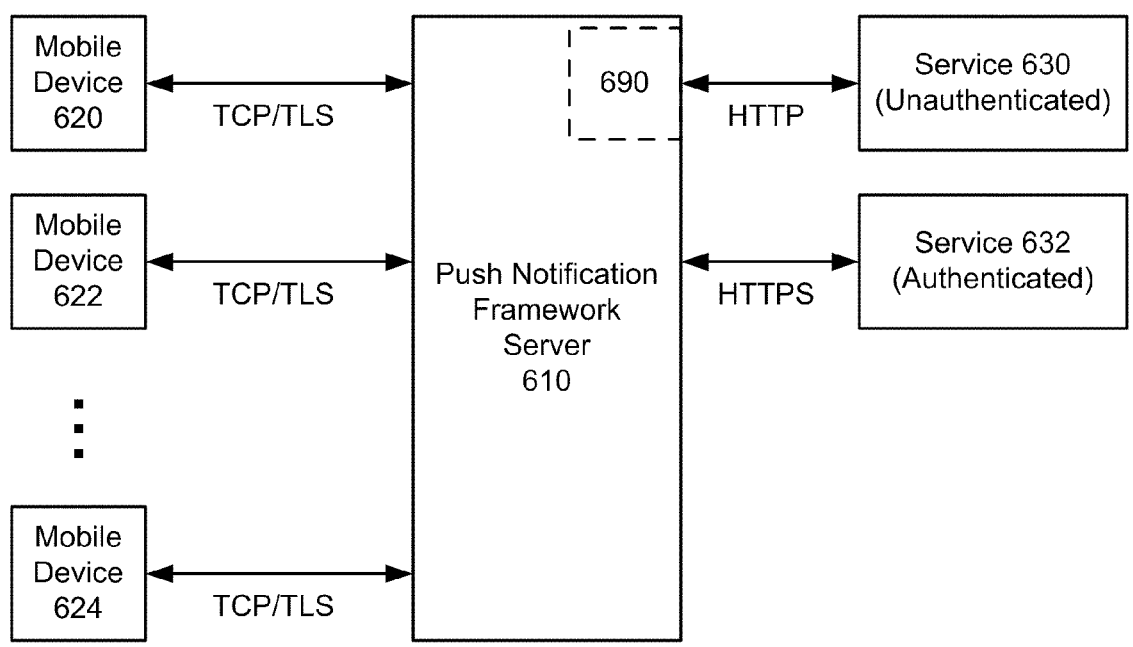
FIG. 6 is a diagram showing a PNF server 610 with a monitoring and regulating module, according to one or more described embodiments.

In the example shown in FIG. 6, service 630 is an unauthenticated service that communicates with PNF server 610 via un-secured HTTP, and service 632 is an authenticated service that communicates with the PNF 610 server via secure HTTP (HTTPS).

As an authenticated service, enough is known about service 632 such that, if a communication flow from service 632 violates acceptable limits (e.g., due to intentional abuse or poor application design), the PNF server 610 can de-authorize the service, which may entail preventing access to client devices (e.g., mobile devices 620, 622, 624) permanently ("blacklisting" the service) or until required remedial measures have been taken.

As an unauthenticated service, the exact identity of service 630 may not be known, which may limit the ability of the PNF server 610 to take direct action against service 630, such as may be desirable in the event that communication flow from service 630 violates acceptable limits (e.g., where service 630 sends an excessive number of notifications in a given time period). However, the PNF server 610 can regulate service 630, even without authentication, using monitoring and regulating module 690. In this example, module 690 throttles push notifications, enforcing limits on the push notifications that can be sent by service 630. The module 690 is flexible, allowing adjustments of limits on numbers of push notifications and other parameters such as time periods. Module 690 can throttle push notifications for all client devices that are accessible by service 630, or for some subset of the devices that are accessible by service 630.

Throttling can be used, for example, to mitigate the potential effects of excessive or inappropriate notifications from services, whether intentional or unintentional. For example, throttling can be used to restrict notifications sent from a service to a particular device (or subscription) to a particular number in a given time period (e.g., 500 notifications per subscription per day, or 32 notifications per subscription per hour).

Module 690 can also throttle push notifications from other services. For example, if service 632 switches from an authenticated mode to an unauthenticated mode, module 690 can throttle push notifications from service 632. The PNF server 610 also can monitor and regulate push notifications from authenticated services, such as by using module 690 or a different module that is specifically designed to monitor and regulate authenticated services.

EXAMPLE 6

Figure 7:
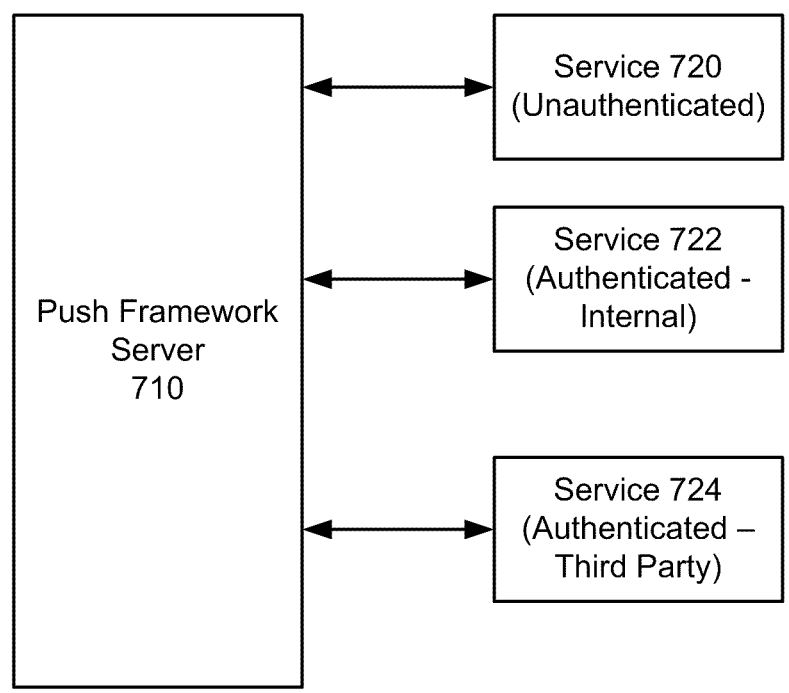
FIG. 7 is a diagram showing a system configuration in which services interact with a push framework in different authenticated modes, according to one or more described embodiments.

FIG. 7 shows an example of a configuration in which services interact with a push framework 710 in different authenticated modes. In the example shown in FIG. 7, an unauthenticated service 720 interacts with the push framework 710 in an unauthenticated mode, and an "internal" (or "first party") service 722 and a "third party" service 724 interact with push framework 710 in authenticated modes. The internal authenticated service 722 interacts with the push framework 710 in an authenticated internal mode, and the third party authenticated service 724 interacts with the push framework 710 in an authenticated third party mode.

As used herein, "internal service" and "first party service" each refer to a service that is affiliated with a push framework. In some embodiments, an internal service occupies a position in a network topography such that the internal service can be automatically authenticated by the push framework. Typically, this will occur when the internal service is controlled by the same entity as the push framework. "Third party service" refers to a service that is not an internal or first party service. Typically, a third party service is not under the control of the same entity that controls the push framework. Internal services can be given trusted status, which can designate such services as trusted services. Trusted services can operate with a reduced level of proof of authentication. A trusted status can be granted to any service that satisfies criteria to qualify as a trusted service. The criteria for determining whether a service is a trusted service will depend on several factors including user needs and expectations, security concerns, etc.

EXAMPLE 7

The process of authentication for services can depend on many factors, such as whether the service is a third party service or a first party/internal service. Referring again to FIG. 7, a distinction between internal services (e.g., service 722) and third party services (e.g., service 724) can be made based on network topography. For example, an internal service may be automatically authenticated based on network topography.

In this example, authenticated first party service 722 is automatically authenticated based on network topography, and authenticated third party service 724 is authenticated using HTTPS to perform a mutual authentication, in which the service 724 confirms the identity of the push framework server 710 by validating the authenticity of a certificate for the push framework, and the push framework server 710 confirms the identity of the service 724 by validating the authenticity of a certificate for the service. Validating authenticity of certificates can involve, for example, checking whether the certificate is issued by a trusted certificate-issuing authority, and then validating the certificate with the trusted certificate-issuing authority. In some embodiments, validating that a service is registered is another step to authenticate a service. For example, when an HTTPS session is established, the push framework server 710 extracts the subject name from the certificate for the service 724 and validates whether the subject name is registered with the push framework.

EXAMPLE 8

A push framework can require any service, whether authenticated or unauthenticated, to be authorized. For example, a push framework can require a service to be authorized to communicate with client devices, or to have access to resources on the push framework or on client devices. A push framework can require proof of authorization. The particular level and method of proof can vary depending on several factors, such as whether a service is authenticated or not. As an example, a service can prove that it is authorized by providing a valid token to the push framework server.

Figure 8:
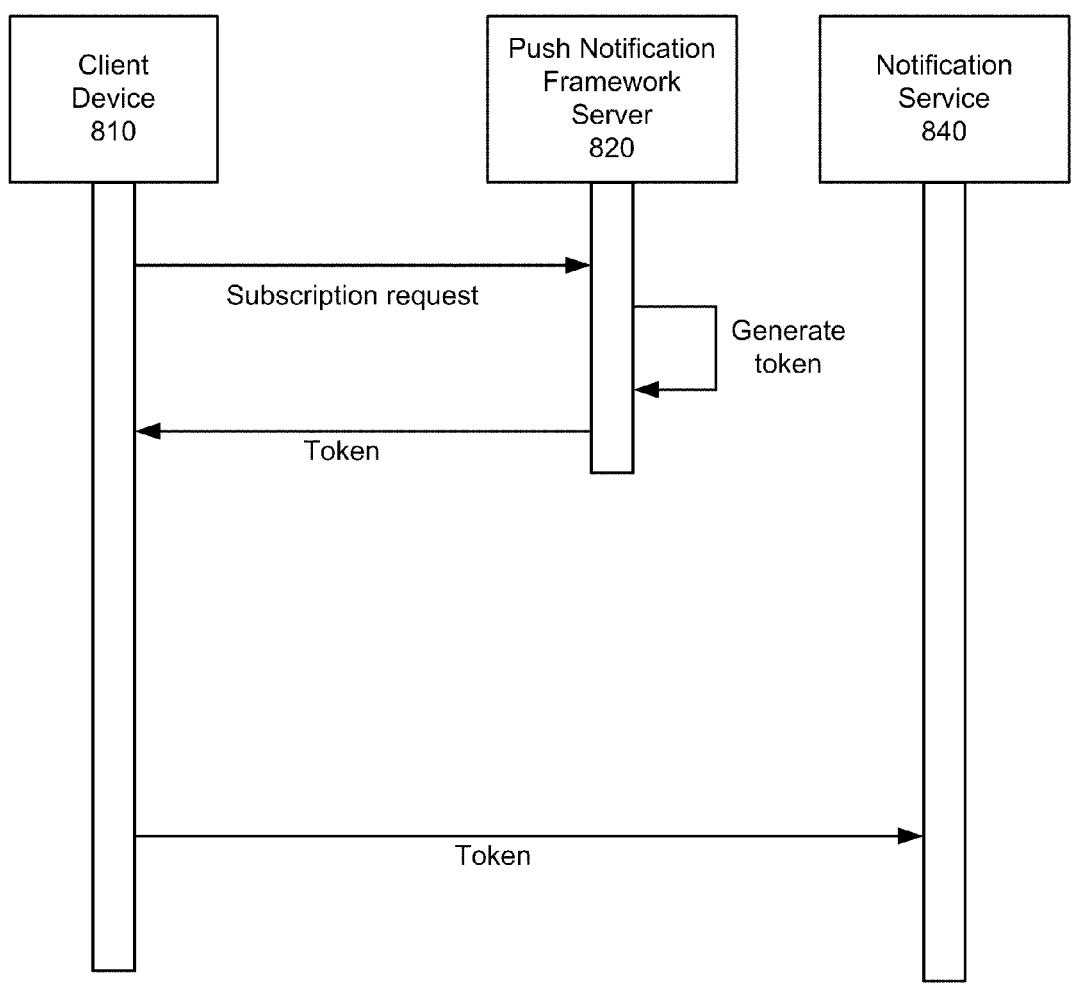
FIG. 8 is a diagram showing a client device that sends a request for a subscription to a push notification framework server, which generates a token that can be used to prove that a service is authorized, according to one or more described embodiments.

In the example shown in FIG. 8, client device 810 sends a request for a subscription to a push notification framework server 820 (PNF server). The requested subscription is for receiving push notifications from a service 840. The PNF server 820 generates a token that can be used to prove that the service 840 is authorized. The token indicates privileges that the service 840 has with regard to particular resources (e.g., the client device 810). For example, privileges can indicate whether a service has permission to push notifications to an individual device or a set of devices, push advertisements to an individual device or a set of devices, retrieve information on user behavior (e.g., by accessing a database that stores information relevant to targeted advertising) or perform some other function.

The PNF server 820 provides the token to the client device 810. The PNF server 820 can provide the token to the client device 810 in any of several possible ways. As an example, the PNF server 820 can use a preexisting secure connection (e.g., a persistent TLS connection) and send the token in encrypted form to the client device 810. When the client device 810 has obtained the token, the client device provides the token to the service 840. The client device 810 can provide the token to the service 840 in any of several possible ways. As an example, a client device 810 can establish a secure connection (e.g., a TLS connection) with the service 840 and send the token in encrypted form to the service.

EXAMPLE 9

Figure 9:
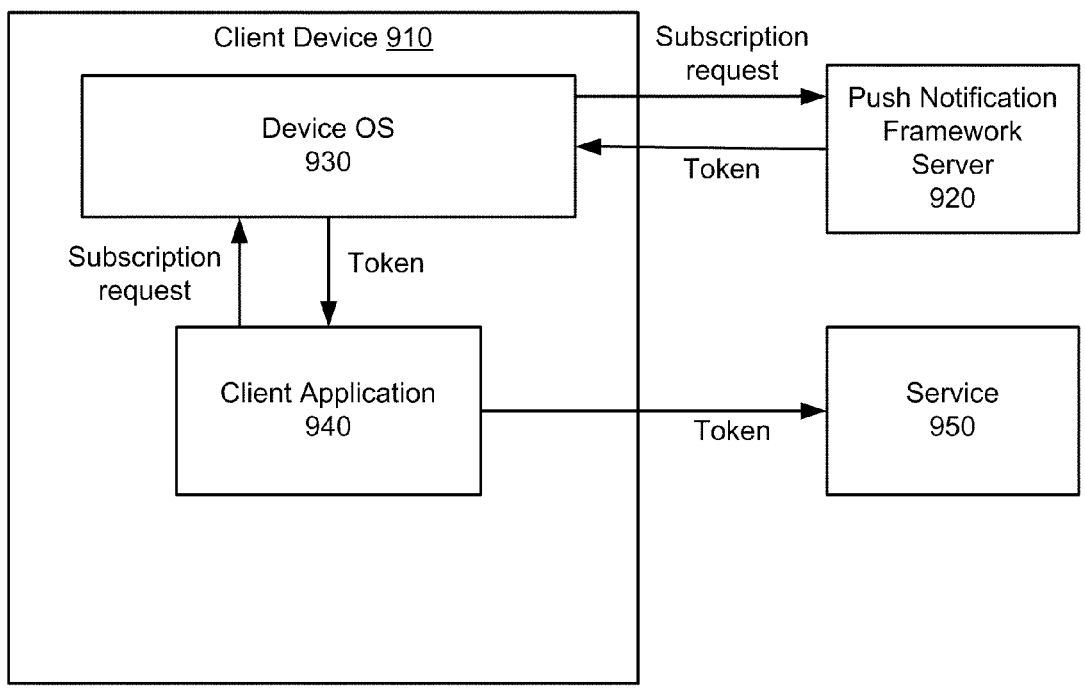
FIG. 9 is a diagram showing activation of a subscription for push notifications, according to one or more described embodiments.

In the example shown in FIG. 9, a user of a client device 910 activates a subscription on a PNF server 920. This example shows an exemplary configuration of and communications by a device OS 930 and a client application 940 within the client device 910, although other configurations and communication models are possible. An application programming interface (API) call is made by the client application 940 to the device OS 930, which sends a request for a subscription to the PNF server 920. The subscription request includes information sufficient to allow the PNF server 920 to provide the correct token for the subscription. For example, in some embodiments a subscription request includes a service name, and the PNF server 920 checks a configuration value associated with the service name. The configuration value can indicate, for example, whether the service is a first-party service or a third-party service. For authenticated services, the service name (registered at the PNF server 920) must match a subject name in a digital certificate provided by a service to the PNF server 920 during service authentication. The PNF server 920 then provides a token to the device 910, via the device OS 930, that corresponds to the requested subscription. For example, the token includes information (such as a URI) that points to a endpoint (e.g., an HTTP or HTTPS endpoint) for communicating with the PNF server 920. The URI contains the address of the PNF server 920, so the service 950 can push notifications to the PNF server for delivery. The device OS 930 provides the token to the client application 940. The client device 910 then provides this token (via the client application 940) to the service 950 (e.g., via a secured or unsecured connection to the service).

For example, client application 940 resides on client device 910 and allows a user of the client device to receive push notifications from a social networking service. Client application 940 does not communicate directly with the PNF server 920. Instead, client application 940 makes an API call (e.g., "getToken") to a push notification client stack on the device OS 930. The device OS 930 translates the API call according to an appropriate protocol and submits it to the PNF server 920. The device OS 930 receives the token in the client stack on behalf of the client application 940. After receiving the token from the client stack, the client application 940 communicates with the service 950 according to an appropriate protocol and securely transmits the token.

Alternatively, subscriptions can be created in other ways. For example, to get a URI that can be used by more than one service, a client device can request a subscription with an empty service name. Such a token can then be used by more than one unauthenticated service.

EXAMPLE 10

This example describes options for authorizing client applications. In this example, a client application can only be installed on a client device if the client application has been authorized for installation. For example, the client application can be authorized if it was purchased from a trusted marketplace, and if the client application adheres to a set of policies (e.g., policies regarding use of a push framework). Certification may require client applications to be written in a particular way (e.g., to ensure that the application operates according to required policies).

In one embodiment, the validation of client applications is performed by the device OS on the client device based on information provided by a trusted marketplace. The authorized client application can then be installed on the client device, and any request from the application regarding push notifications (e.g., a request to get a subscription token) is trusted.

Described options for authorizing client applications can be used in combination with flexible authentication. For example, if client applications are required to be authorized, developers of new client applications for a service can still avoid authentication of the service (if an unauthenticated mode is desired) and push notifications to client devices, as long as the new client application has been developed according to any required policies.

EXAMPLE 11

In described embodiments, services provide tokens along with pushed information when sending the pushed information to a push framework. The tokens include information to prove to the push framework server that the service providing the token is authorized.

Figure 10:
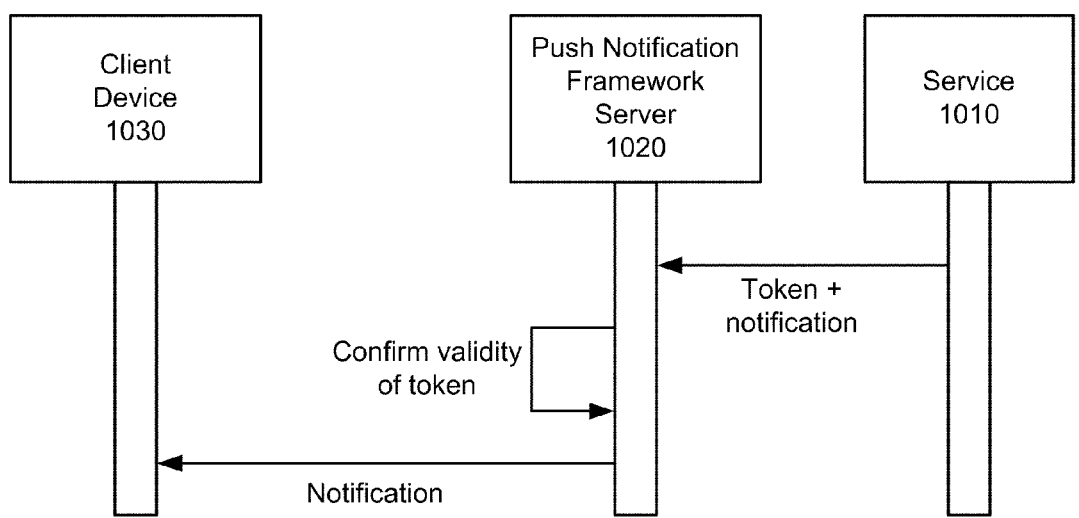
FIG. 10 is a diagram showing services that provide tokens along with pushed information when sending pushed information to a push framework, according to one or more described embodiments.

In the example shown in FIG. 10, a service 1010 provides a token and a push notification to a PNF server 1020. The PNF server 1020 confirms the validity of the token. For example, the PNF server 1020 can compare the token with a table of valid tokens to check that the token is valid, or the PNF server 1020 can perform some other function with the token (such as a hash function) to determine if the token is valid. If the token is valid, the PNF server 1020 forwards the push notification to the client device 1030. Upon receipt of the push notification, the client device 1030 can present an alert (e.g., a pop-up notification on a display of the client device 1030) that indicates receipt of the push notification.

EXAMPLE 12

Tokens can be formatted in different ways and can contain different kinds of information. The choice of specific uses for tokens, and formats and contents of tokens, can depend on several factors, including the type of service that will be using the token (e.g., authenticated or unauthenticated, third party or internal). The token can indicate different things to a push framework. For example, a token can indicate that a service is authorized to send push notifications. A token also can indicate whether the service sending the token is a first party (or internal) service or a third party service. A token also can indicate whether push notifications from the service sending the token should be monitored or regulated (e.g., by throttling push notifications). A token also can indicate a resource (e.g., an HTTP endpoint) to facilitate sending pushed information to client devices.

In the example shown in FIG. 11, tokens 1110, 1112, 1114 are shown for an authenticated first party service, an authenticated third party service, and an unauthenticated third party service, respectively. The tokens 1110, 1112, 1114 are formatted as HTTP or HTTPS uniform resource identifiers (URIs). The tokens are shown in the following form:

[transferProtocol]://[IPAddress]/[serviceType]/[protocolVersion]/[subscriptionInfo]

where "[transferProtocol]" indicates the transfer protocol (e.g., HTTP, HTTPS), "[IPAddress]" is an IP address representing an HTTP or HTTPS endpoint for the service, "[serviceType]" is the type of service (e.g., first party or third party, authenticated or unauthenticated, throttled or unthrottled), "[protocolVersion]" is a protocol version number, and "[subscriptionInfo]" is subscription information that facilitates sending pushed information to client devices.

In one embodiment, subscription information includes encrypted content (also called an encrypted "blob") that identifies a target client application on a client device to receive a push notification, and identifies a TLS session for the client device. The TLS session information allows a push framework server to use a TLS connection to send the push notification to the identified target client application. At the client device, a push notification client stack receives the push notification and the client application information and forwards the push notification to the client application. Subscription information also may include other information such as the name of the service (if known).

Token 1110 is a token for an authenticated first party (or internal) service. In this example, the service is authenticated based on network topology. The placeholder "<PrivateIP>" in the URI represents a PNF server's private HTTP endpoint for the first party service.

Token 1114 is a token for a throttled (unauthenticated) third party service. The placeholder "<PublicIP>" in the URI represents a PNF server's HTTP endpoint for the unauthenticated third party service.

Token 1112 is a token for an unthrottled (authenticated) third party service. In this example, the service is authenticated using certificates. The placeholder "<PublicIP>" in the URI represents a PNF server's HTTPS endpoint for the authenticated third party service.

EXAMPLE 13

A service can use HTTP verbs when pushing information to a push framework. This can be useful, for example, when the service is a RESTful web service.

FIG. 12 shows an example of an HTTP POST message 1200 containing a push notification sent by a third party service. The HTTP POST message includes information indicating a protocol version, encrypted content, a public IP address for a PNF server, content type, content length (i.e., the length of the push notification), and the push notification itself (in this example, the word "Hello"). The PNF server will receive and deliver the notification to the client device as indicated by the token.

EXAMPLE 14

The process of service authorization can depend on many factors, such as whether a service seeking authorization is authenticated or unauthenticated.

In this example, a push framework determines whether a service is authorized by validating a token provided by the service. The push framework decrypts encrypted content in the token to obtain a service name and a pointer to a subscription endpoint (e.g., a TLS session with a client device). The push framework checks the service name associated with a previously created subscription associated with the TLS session on a session manager on a push framework server to see if it matches the service name included in the token. If so, the pushed information is authorized for delivery, and the pushed information can be delivered. For example, the pushed information can be queued for later delivery to an appropriate client device.

The push framework also can make additional checks to determine whether pushed information is authorized for a particular client device or subscription. For example, the push framework can check whether a push notification complies with additional parameters associated with a subscription, such as time ranges which can limit when push notifications can be delivered.

EXAMPLE 15

In this example, a PNF implements flexible authentication and authorization techniques. The PNF provides authenticated modes and an unauthenticated mode for services that send push notifications to client devices. The PNF also permits authorization to be denied or revoked under certain conditions. To receive push notifications from service, a client device creates a subscription with the PNF. The client device provides a service name for the service at the time of creating the subscription. The PNF then provides a subscription token corresponding to the service. The service uses the subscription token to push notifications to the client device.

In authenticated modes, services that communicate with the PNF are able to confirm that they are communicating with a valid PNF, and the PNF is able to confirm that it is receiving notifications from a known service. One authenticated mode is for third-party services. Third-party authenticated services provide a service certificate, which includes a service name in the subject name of the certificate, to the PNF. The third-party service certificate's subject name is registered with the PNF and is marked as an external (third-party) service. To receive push notifications, a client device creates a subscription by sending a subscription request with the appropriate service name to the PNF. The PNF provides a subscription token containing a front-end HTTPS endpoint after authenticating that the service name is registered and marked as an external (third-party) service. The client device provides the subscription token to the third-party service. Using the HTTPS endpoint, the third-party service pushes notifications to the client device. The third-party service also can use the HTTPS endpoint to confirm that it is communicating with a valid PNF. Furthermore, the PNF can re-authenticate by comparing the subject name of the certificate received in the HTTPS session with the service name registered by the PNF.

Another authenticated mode is for first-party (internal) services. First-party services provide a service certificate, which includes a service name in the subject name of the certificate, to the PNF. The first-party service certificate's service name is registered with the PNF and marked as an internal service. To receive push notifications, a client device creates a subscription by sending a subscription request with the appropriate service name to the PNF. The PNF provides a subscription token containing a back-end HTTP endpoint to the client device, after confirming that the service name is registered and marked as an internal (first-party) service. The client device provides the subscription token to the service. The service uses the back-end HTTP endpoint to push notifications to the client device. The service also can authenticate that it is communicating with a valid PNF using the back-end HTTP endpoint. Furthermore, the PNF can re-authenticate by confirming that any notification received on the back-end HTTP endpoint is from a first-party service. No third-party service will be able to access back-end HTTP endpoints, because back-end HTTP endpoints are only exposed to first-party services.

The PNF also provides an unauthenticated mode. In the unauthenticated mode, the PNF allows unauthenticated services to send push notifications, subject to throttling controls. In this example, unauthenticated mode is used if a service (first-party or third-party) cannot be authenticated at the time of subscription creation. The unauthenticated service is provided with a front-end HTTP endpoint of the PNF. Notifications coming through this endpoint are throttled. For example, unauthenticated services will only be authorized to push notifications up to a set limit per subscription, per day, per device. If the limit is reached on a subscription, the PNF stops or pauses the notification flow from that service. Alternatively other limits can be set. For example, a time period can be set in terms of hours or minutes, rather than days.

The PNF also permits authorization to be denied or revoked under certain conditions. The PNF can revoke notification flow to a specific subscription or device. For example, the PNF can cancel a subscription (or invalidate a token) to stop notification flow. Furthermore, the PNF can blacklist (i.e., block future notifications for) an application or service based on its application name or service name, as appropriate.

Figure 13:
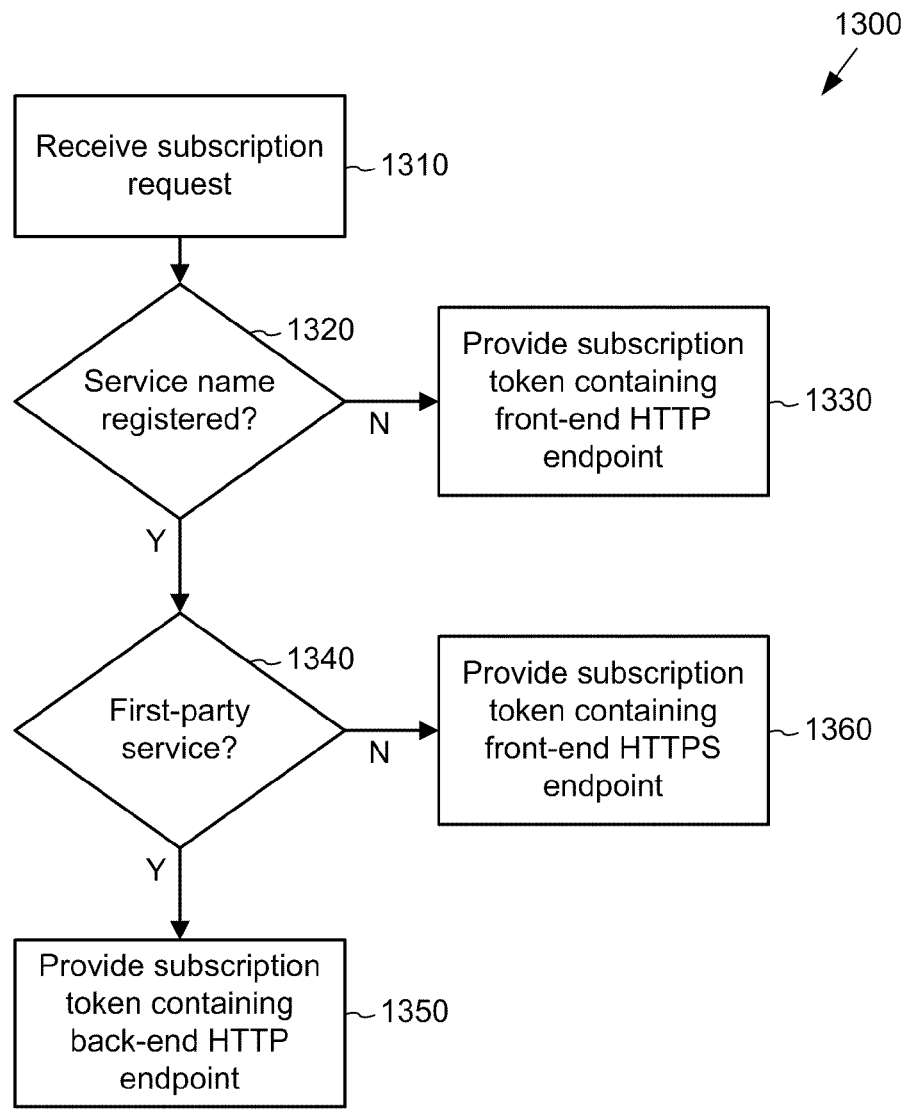
FIG. 13 is a flow chart depicting an example technique 1300 for providing subscription tokens in a push notification framework, according to one or more described embodiments.

FIG. 13 is a flow chart depicting an example technique 1300 for providing subscription tokens in a push notification framework. At 1310, a PNF server receives a subscription request, which includes a service name. At 1320, the PNF server determines whether the service name is registered with the PNF. If the service name is not registered, the service is unauthenticated, and the PNF provides (1330) a subscription token containing a front-end HTTP endpoint to the client device. If the service name is registered, the service is authenticated, and the PNF checks (1340) based on the service name whether the service a first-party service. If the service is a first-party service, the PNF server provides (1350) a subscription token containing a back-end HTTP endpoint to the client device. If the service is not a first-party service, the PNF server provides (1360) a subscription token containing a front-end HTTPS endpoint to the client device.

EXAMPLE 16

Figure 14:
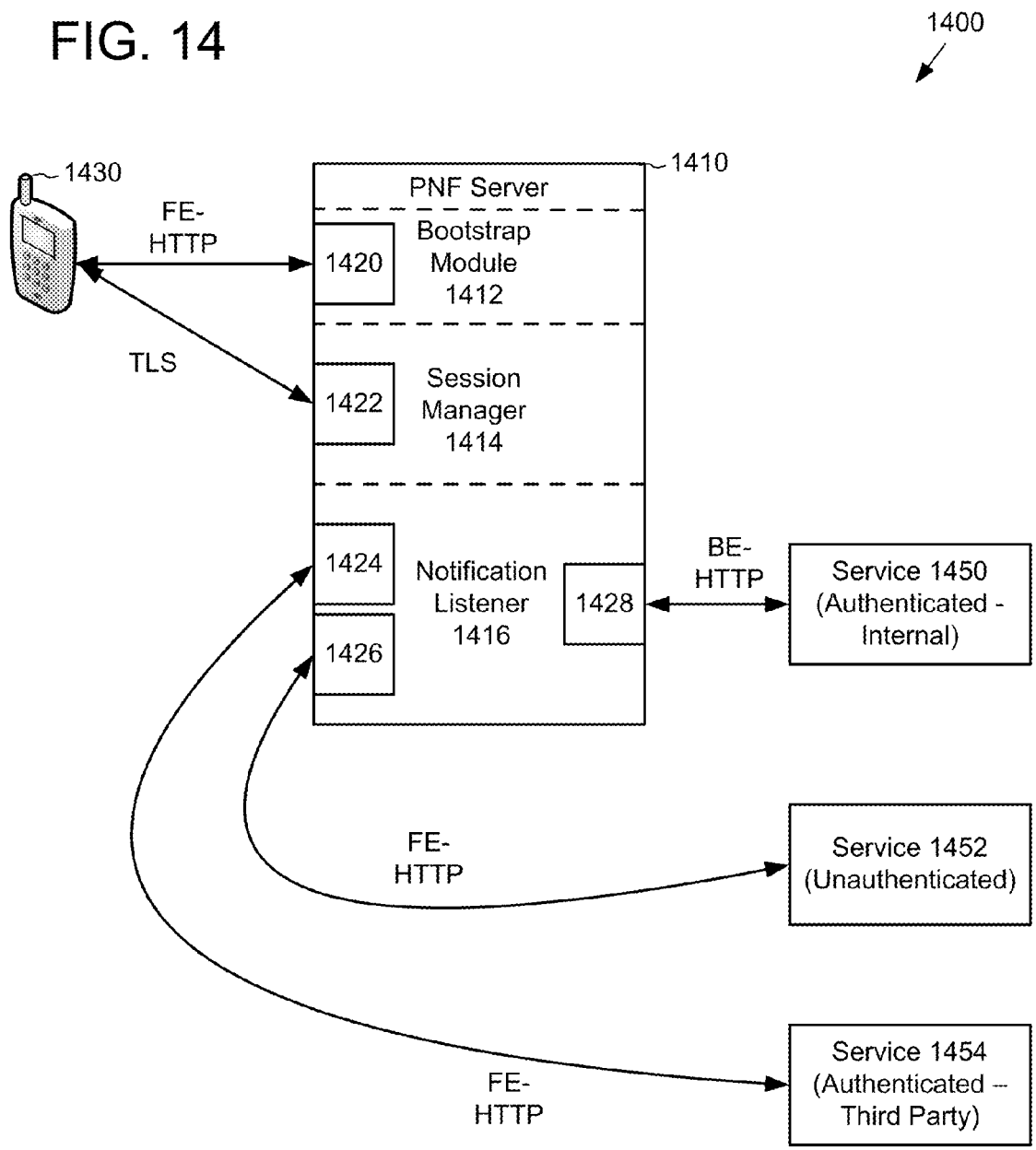
FIG. 14 is a diagram depicting a detailed example cloud computing arrangement for a push notification framework, according to one or more described embodiments.

FIG. 14 is a system diagram depicting a detailed example cloud computing arrangement 1400 for a push notification framework. A PNF server 1410 includes a bootstrap module 1412, a session manager 1414, and a notification listener 1416. The PNF server also includes front-end ports 1420, 1422, 1424, 1426 and back-end port 1428 which can be identified by IP addresses (e.g., IP addresses in subscription tokens). A mobile client device 1430 communicates with PNF server 1410 using different protocols. To communicate with the bootstrap module 1412, the mobile client device 1430 uses HTTP and connects to the PNF server 1410 using a front-end (FE) HTTP endpoint identified by virtual IP address 1440. For example, a connection is made using front-end port 1420, identified as "port 80" in the PNF server 1410. To communicate with the session manager 1414, the mobile client device 1430 establishes a persistent TLS connection. For example, a push notification client stack on the client device establishes the persistent connection with the PNF server 1410 using front-end port 1422, identified as "port 443" in the PNF server 1410.

Mobile client device 1430 can subscribe to receive push notifications from services 1450, 1452, 1454. For example, mobile client device 1430 creates a subscription and receives a subscription token containing a notification endpoint appropriate to one of the services 1450, 1452, 1454, according to the example technique 1300 depicted in FIG. 13. In one embodiment, a client application requests a token via a client stack API, and the client stack establishes a TLS connection if a TLS connection has not already been established, e.g., if the corresponding client application is the first application on the device to request a token. Upon receiving the token, the mobile client device 1430 provides the token to the appropriate service (e.g., service 1450, 1452, or 1454).

When a service needs to push information (e.g., a notification) to the PNF server 1410, it will establish an HTTP or HTTPS session (as appropriate) and push the information. For example, a service uses the token provided by the mobile client device to post a notification using an HTTP POST command. In some embodiments, tokens take one of the forms shown in FIG. 11, depending on whether a service is authenticated or unauthenticated, and whether the service is a first-party service or a third-party service. As shown in FIG. 14, authenticated first-party service 1450 sends push notifications to the notification listener 1416 using a back-end (BE) HTTP endpoint. For example, a connection is made using back-end port 1428, identified as "port 80" in the PNF server 1410. Unauthenticated service 1452 sends push notifications to the notification listener 1416 using a front-end (FE) HTTP endpoint. For example, a connection is made using front-end port 1426, identified as "port 80" in the PNF server 1410. Authenticated third-party service 1454 sends push notifications to the notification listener 1416 using a front-end (FE) HTTPS endpoint. For example, a connection is made using front-end port 1424, identified as "port 444" in the PNF server 1410.

The PNF server will identify a subscription with a unique virtual port rather than a physical port in the networking stack. In one embodiment, subscription information in a subscription token contains a unique number to identify the subscription under a given session with the device. The persistent session opens a single port on the device and on the PNF server (port 443), and with that session and physical port multiple subscriptions and applications are identified via logical ports.

The PNF server 1410 authenticates the service if a push notification arrives on (a) an HTTPS endpoint or (b) a private (back-end) HTTP endpoint. In case (a), authentication is based on a certificate exchange as well as on a confirmation that the service's certificate subject name (i.e., the service name) is registered (or "whitelisted") with the PNF server 1410. In case (b), authentication is implicit since only internal/first-party services will be able to reach that endpoint of the PNF server 1410, due to network topography.

The PNF server 1410 does not authenticate the service if a push notification arrives on a front-end HTTP endpoint, which is used in unauthenticated mode. If the token indicates that a push notification is authorized, the PNF server pushes the notification to the mobile client device 1430. In unauthenticated mode, push notifications are throttled.

EXAMPLE 17

In one embodiment, a push notification framework (PNF) is implemented as a "best efforts" system, in which it is permissible to not deliver notifications, depending on conditions. For example, notifications can be pushed to client devices so long as capacity for storing the notifications is not exceeded. As another example, notifications may not be delivered where a user has requested that notifications from a given service be paused and stored for later delivery, or where the user has set a customized limit on the number of notifications that should be delivered during a given time period. The PNF will typically have finite storage space allocated to the user and/or service for undelivered notifications, and may have to drop undelivered messages if the space limit is exceeded. If this occurs, the PNF can notify the user or the user's device and include information describing, for example, number of messages lost, time and date ranges of lost messages, etc. Such data may be provided for taking corrective action or simply for the user's information.

EXAMPLE 18

Described embodiments of a push notification framework (PNF) take into account one or more of the threat scenarios and possible mitigations shown below in Table 1:

TABLE 1

| ID | Threats | Mitigations |
| --- | --- | --- |
| T_1 | Unauthenticated third-party service's application uses the name of a first-party service at subscription creation to get authenticated as first-party service. | The PNF will provide the back-end(BE) HTTP endpoint subscription token. This token cannot be used to push notifications through the PNF. |
| T_2 | Unauthenticated third-party service's application uses the name of another authenticated third-party service. | The PNF will provide the front-end (FE) HTTPs endpoint subscription token. However, when the service uses this endpoint, the PNF will re-verify the service by extracting the certificate subject name and comparing to the one registered. This will result in rejection of the notification request. |
| T_3 | Attacker gets subscription token of a valid authenticated third-party service and uses it to send random notifications. | The PNF will reject the notifications as the authentication will fail from that service. |

TABLE 1-continued

| ID | Threats | Mitigations |
| --- | --- | --- |
| T_4 | Attacker gets subscription token of a valid authenticated first-party service and uses it to send random notifications. | The notifications will not reach PNF as the subscription token points to BE HTTP endpoint of the PNF. |
| T_5 | Attacker gets subscription token of a valid unauthenticated third-party/first-party service and uses it to send random notifications. | Third-party application running on the device will be validated against a policy and authenticated based on a unique AppID at the time of installation on the device. Hence writing a malicious application that can extract the subscription token of another service is mitigated. Furthermore when an application provides the subscription token to its respective service it will use the secure connection to avoid interception of subscription token. |
| T_6 | Attacker guesses the subscription token and sends notification. | The subscription token contains a random value (e.g., a 16 byte random value) which will mitigate the risk of guessing the token. Furthermore, the subscription token structure can be changed without requiring changes on the client to server and server to server protocols. |
| T_7 | Attacker "jail breaks" the phone to grab the subscription token of other application on the device. | Only attacker's phone will be impacted and this is assuming that the subscription token is for a valid unauthenticated service. Otherwise T_1 and T_2 mitigations will apply. |
| T_8 | Attacker reverse engineers the client to server protocol and uses the client to create many subscriptions and sends notification on those subscriptions. | Each device can create a limited number (e.g., at most 20) subscription tokens. |

EXAMPLE 19

In addition to throttling controls that can be implemented, for example, on a push notification framework (PNF), additional flow control mechanisms can be employed at a client device. These can include user modes or preferences (e.g., "do not disturb," or "conserve battery"), which can be used to stop or reduce delivery of notifications.

A user can stop future notifications with a user-initiated revocation of authorization, if notifications are excessive or otherwise inappropriate from the user's perspective, such as by temporarily or permanently suspending delivery of new notifications, or by removing an application on the user's device. For example, at a PNF server, such user actions can be interpreted as a request to cancel the subscription that links the user's device to the service. The PNF can then cancel the subscription, and future notifications (even if accompanied by a previously valid token) will be prevented from reaching the user. The user-initiated revocation can be done in combination with functionality such as the described throttling function. This can be useful, for example, where the user's personal threshold for what constitutes excessive notifications is less than the notification limit set by the PNF (e.g., 500 notifications per day).

When notifications are suppressed, they can be deleted, queued for later delivery, or processed in some other way.

Exemplary Client Devices

In any of the examples herein, a client device can be a computing device that is capable of wired communication, wireless communication, or both wired and wireless communication. For example, a client device can be a mobile communications device (e.g., a cell phone or a smart phone), a computer (e.g., a laptop, desktop, or tablet computer), a personal digital assistant ("PDA"), or another type of computing device with a built-in or add-on wireless network adapter (e.g., a Wi-Fi wireless network adapter). Client devices that are capable of wireless communication can be referred to as a client wireless device. For example, a client wireless device can be a laptop or PDA with an 802.11b or 802.11g wireless network adapter.

Client devices can be mobile or stationary. For example, a user can carry a client wireless device to various locations (e.g., by walking with a PDA to various locations on a corporate campus or by driving to various locations within a city).

A client device can perform functions (e.g., a sequence of functions) automatically. For example, a client device can automatically listen for push notifications from services that the device subscribes to, and display alerts. Functions that a client device can perform automatically (e.g., without user intervention) can also be performed manually (e.g., with user intervention).

A client device can include software (e.g., a software program or module) allowing the client device to perform various functions in order to receive and use information. For example, the software can allow the client device to listen for push notifications from services that the device subscribes to, and display alerts based on information received in push notifications.

Exemplary Wireless Networks

In any of the examples herein, a wireless network can be used to provide services to client wireless devices. A wireless network can be a wireless computer network. For example, a wireless network can be a Wi-Fi wireless network (a wireless network operated under the Wi-Fi IEEE 802.11 standard, such as 801.11a, 802.11b, 802.11g, 802.11n, etc.). Other types of wireless networks (e.g., other wireless network protocols and technologies) can also be used to provide location-based services, such as Bluetooth (IEEE 802.15), WiMAX (IEEE 802.16), and other wireless network technologies.

A wireless network can comprise various components. A wireless network can include wireless network adapters. For example, wireless network adapters can include wireless cards (e.g., Wi-Fi cards) in computers, PDAs, cell phones, smart phones, or other computing devices. Wireless network adapters can be built-in (e.g., a PDA with built-in, or integrated, wireless capability) or added (e.g., a laptop with a wireless network adapter card). Wireless network adapters can also include wireless access points when operated as adapters (e.g., in ad-hoc mode). A wireless network adapter can be operated, for example in infrastructure mode (e.g., with a central point through which all wireless traffic passes), or in ad-hoc mode (e.g., supporting peer-to-peer connections between wireless network adapters).

A wireless network can be operated in various modes. For example, a wireless network, such as a Wi-Fi wireless network, can be operated in ad-hoc mode. Ad-hoc mode can be a mode in which wireless network adapters communicate directly (e.g., peer-to-peer communication), without the need for a central access point in infrastructure mode.

Exemplary Systems for Providing Services to Client Wireless Devices

Figure 15:
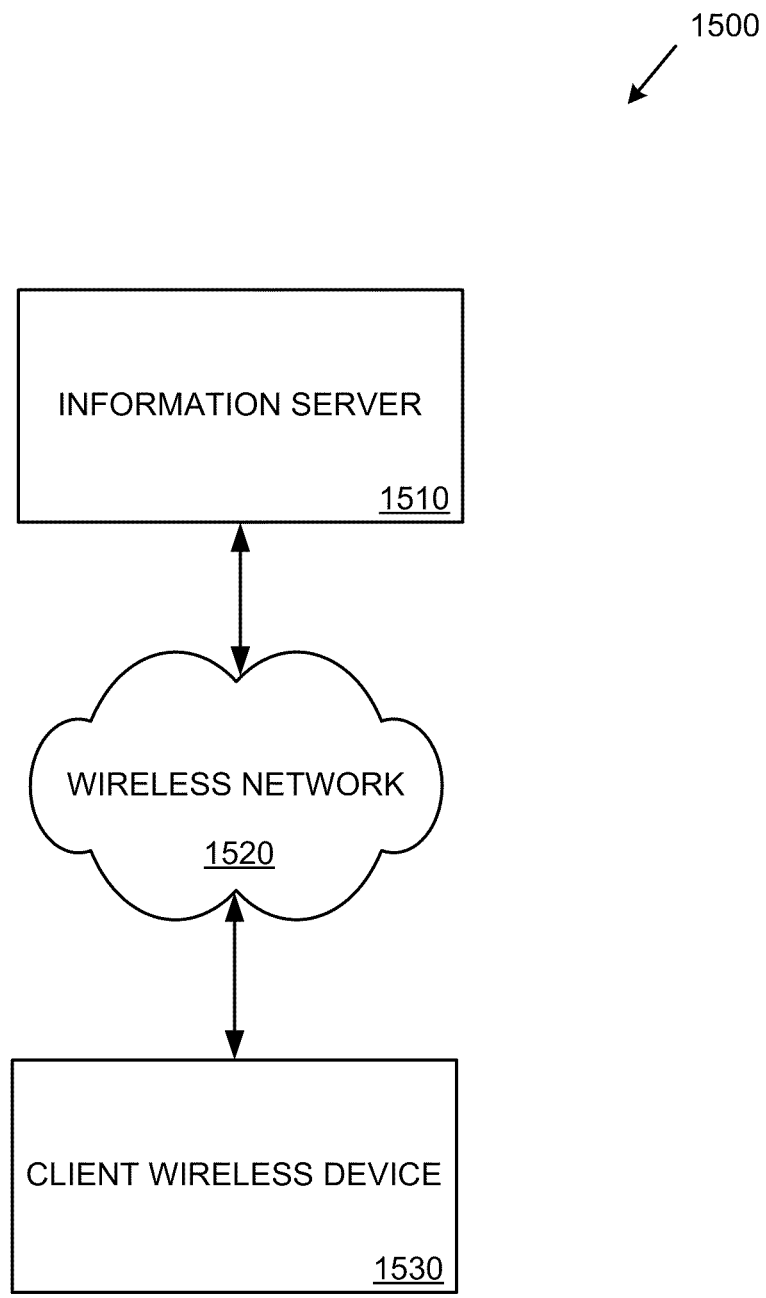
FIG. 15 is a diagram showing a first exemplary system for providing services to wireless devices, according to one or more described embodiments.

FIG. 15 shows a first exemplary system 1500 for providing services to wireless devices. In the example system, an information server 1510 provides services to a client wireless device 1530 via a wireless network 1520. For example, the information server 1510 can provide push notification information using a wireless network adapter (e.g., a wireless network adapter located at the information server, or a remotely located wireless network adapter).

The wireless network 1520 can be a Wi-Fi wireless network. The wireless network 1520 can be generated by a wireless network adapter of the information server 1510 and can encompass a wireless network zone. The wireless network 1520 can be an ad-hoc wireless network.

For example, the information server 1510 can comprise a wireless network adapter configured in ad-hoc mode. The information server 1510 can provide location-based services by sending, via the wireless network adapter, push notification information. The client wireless device 1530 can also comprise a wireless network adapter configured in ad-hoc mode. The client wireless device 1530 can connect to the wireless network 1520 in ad-hoc mode (e.g., to the wireless network adapter of the information server 1510) and receive the push notification information.

The system 1500 can be a wireless network infrastructure comprising one or more information servers (e.g., information server 1510) providing services to one or more client wireless devices (e.g., client wireless device 1530).

Figure 16:
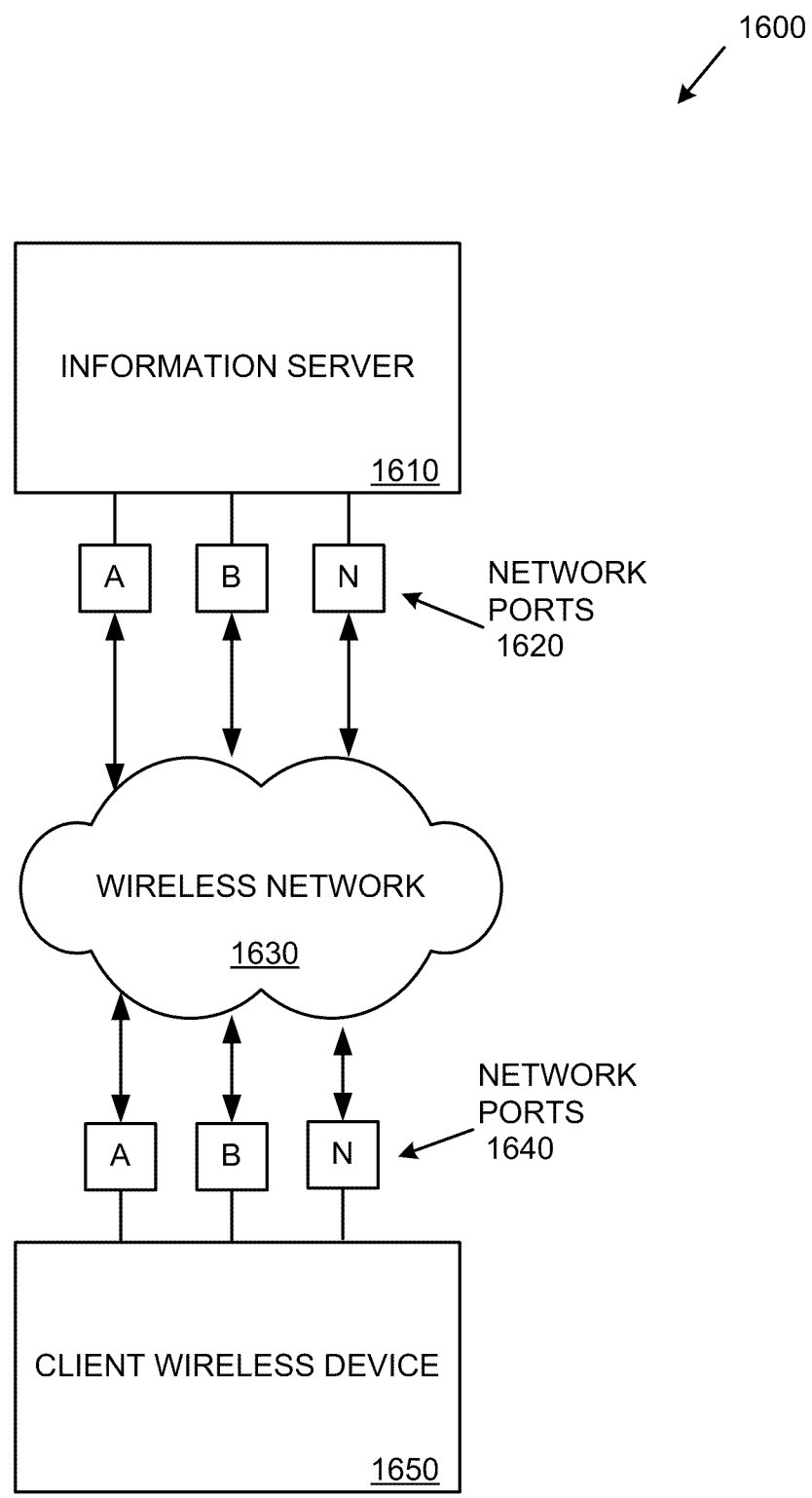
FIG. 16 is a diagram showing a second exemplary system for providing services to wireless devices, according to one or more described embodiments.

FIG. 16 shows a second exemplary system 1600 for providing services to wireless devices. For example, the information server 1610 can send push notification information within an ad-hoc wireless network zone via a wireless network adapter configured in ad-hoc mode.

The information server 1610 provides location-based services by sending, over the wireless network 1630, service information via a number (e.g., an arbitrary number) of network ports 1620. For example, for a service that provides push notification information, different types of push notification information can be associated with a specific network port (e.g., a specific network port number).

The client wireless device 1650 receives service information from the information server 1610. The client wireless device 1650 can receive the service information by listening on a number (e.g., an arbitrary number) of network ports 1640 (e.g., listening using network sockets). For example, the client wireless device 1650 can listen on a specific network port (e.g., a specific network port number) associated with push notification information from a specific service.

For example, the information server can send push notification information for a specific service on network port "A" (one of the three network ports depicted at 1620). The client wireless device 1650 can be listening (e.g., continuously listening) on network port "A" (one of the three network ports depicted at 1640) for the push notification information for the specific service. When client wireless device 1650 detects the information on network port "A", the client wireless device 1650 can receive the push notification information.

The information server 1610 can send information using the UDP protocol (the User Datagram Protocol of the Internet Protocol suite), and the client wireless device 1650 can receive the information using the UDP protocol. The information server 1610 can use specific UDP port numbers (e.g., sending information from a specific UDP source port number to a specific UDP destination port number). For example, network port "A" 1620 can correspond to UDP port number "120," and network port "A" 1640 can correspond to UDP port number "120." Port number "120" can correspond to a specific location-based service, such as a library location-based service. Similarly, network port "B" can correspond to UDP port number "130," and network port "N" can correspond to UDP port number "140."

Different port numbers can also be used for the information server 1610 side and the client wireless device 1650 side. For example, network port "A" 1620 (e.g., the "broadcasting" side) can correspond to UDP port number "120," and network port "A" 1640 (e.g., the "receiving" side) can correspond to UDP port number "121."

The specific port numbers can be known to the information server 1610 and the client wireless device 1650. As a result, the information server 1610 and client wireless device 1650 can know which network port numbers on which to listen for specific services.

In other examples described herein, a PNF client and a PNF server will just use a single physical port, and each application's subscription will be identified via a virtual port.

Exemplary User Interfaces Depicting Preferences

Figure 17:
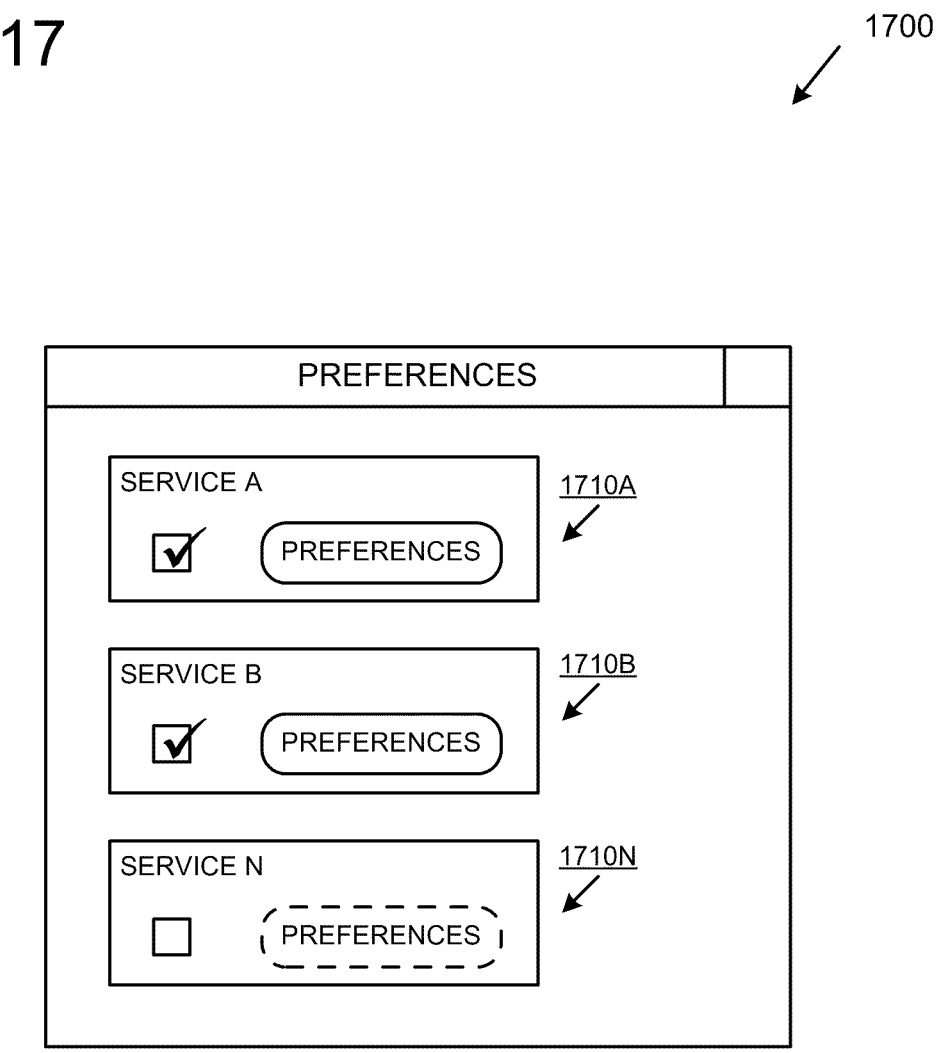
FIG. 17 is a diagram showing a first exemplary user interface depicting preferences, and can be used for setting preferences, according to one or more described embodiments.

FIG. 17 shows a first exemplary user interface 1700 depicting preferences, and can be used for setting preferences. The user interface 1700 can be displayed, for example, by client wireless devices. In the user interface 1700, a number of preferences are displayed 1710A-N. The user interface 1700 can be the user interface of a client wireless device, and the preferences 1710A-N can control how the client wireless devices receives and processes (e.g., filters and displays) push notification information related to different services.

At 1710A, a preference for "Service A" is displayed. Associated with preference 1710A is a checkbox that has been checked (e.g., by a user of the user interface). A checked checkbox can indicate that the respective service is enabled (e.g., that push notification information will be received, and alerts displayed, for "Service A"). In addition, a "Preferences" user interface control (e.g., a button or link) is associated with preference 1710A. The "Preferences" user interface control can allow a user to configure additional preferences regarding "Service A."

At 1710B, a preference for "Service B" is displayed, and at 1710N, a preference for a specific location-based service ("Service N") is displayed. Associated with preference 1710N is a checkbox that has not been checked. The unchecked checkbox can indicate that the location-based service is disabled (e.g., that push notification information will not be received, and thus no alerts displayed, for "Service N"). In addition, "Preferences" user interface controls (e.g., a button or link) are associated with preferences 1710B and 1710N, respectively. The "Preferences" user interface control associated with preference 1710N is depicted as disabled (e.g., a user cannot configure additional preferences regarding "Service N" because it has been disabled).

Figure 18:
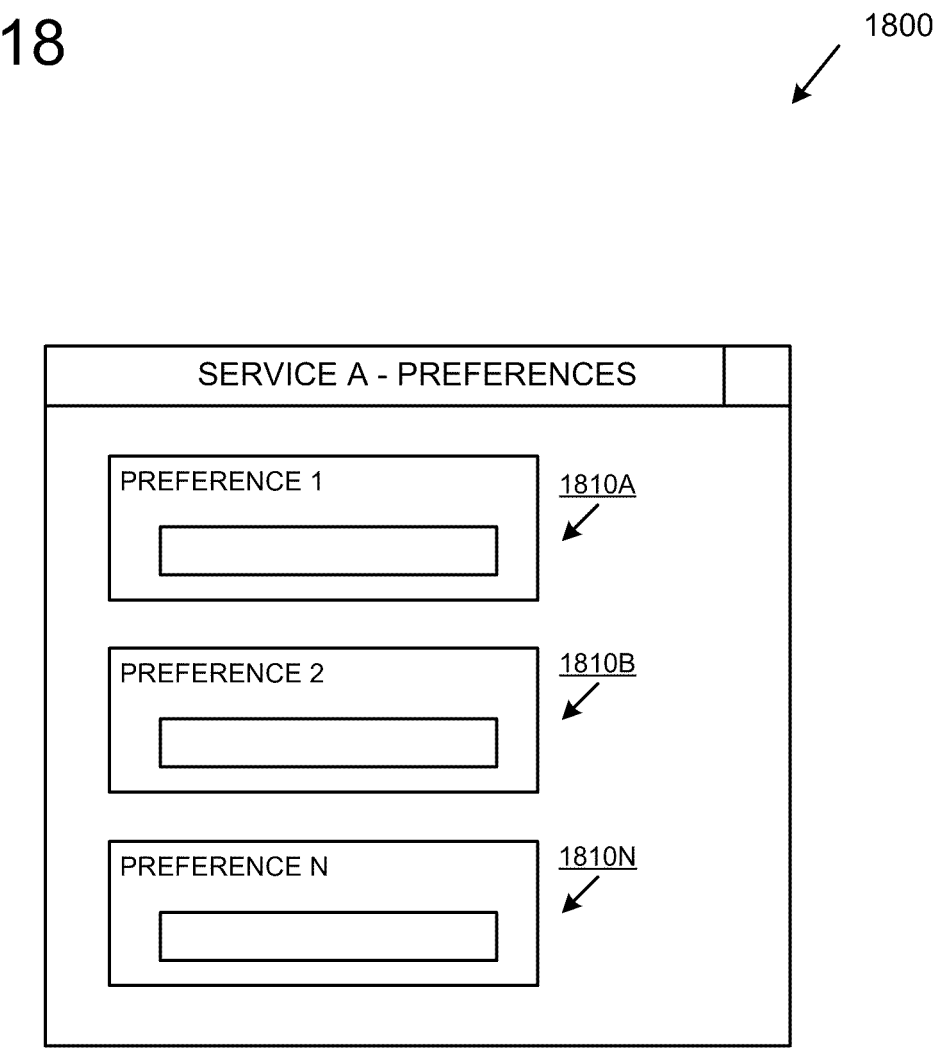
FIG. 18 is a diagram showing a second exemplary user interface depicting preferences, which can be used to set preferences, according to one or more described embodiments.

FIG. 18 shows a second exemplary user interface 1800 depicting preferences, which can be used to set preferences. The user interface 1800 can be displayed, for example, by client wireless devices. In the user interface 1800, a number of preferences are displayed (1810A, 1810B, 1810N) for a specific service (in this example, "Service A"). The preferences (1810A, 1810B, 1810N) can control how the client wireless devices receives and processes (e.g., filters and displays) push notification information related to "Service A."

For example, the preferences (1810A, 1810B, 1810N) can allow a user to control the display of alerts related to push notifications from "Service A." For example, 1810A can be a preference allowing the user to choose (e.g., via a drop-down user interface control) an alert method (e.g., audio notification, pop-up window, etc.) to indicate to the user when a push notification has been received.

Any number (e.g., an arbitrary number) of preferences can be displayed in the user interface 1800 for a specific location-based service.

Exemplary Alerts

In any of the examples herein, alerts can be presented on client devices. Alerts can be presented when the client device receives push notifications. Alerts can be presented after filtering push notifications using preferences. The presentation of alerts can involve visual presentation, audio presentation, other presentation (e.g., vibration or other physical movement of a client device) or a combination.

Alerts can be displayed in a variety of formats. For example, an alert can be indicated by a pop-up window or badge on a display of a client device, or by a blinking or flashing light. As another example, alerts can be presented by audio (e.g., an audible beep or ring).

Alerts can contain a variety of information. For example, an alert can contain text, pictures, multimedia (e.g., audio and video), links (e.g., links to Web sites), and other types of information. A numbered badge notification can indicate not only that an alert is active, but also a number of similar alerts. For example, a numbered badge that indicates the arrival of several push notifications can be represented by a badge representing push notifications and a number on the badge indicating a number of push notifications that have arrived at the client device.

Exemplary Computing Environment

Figure 19:
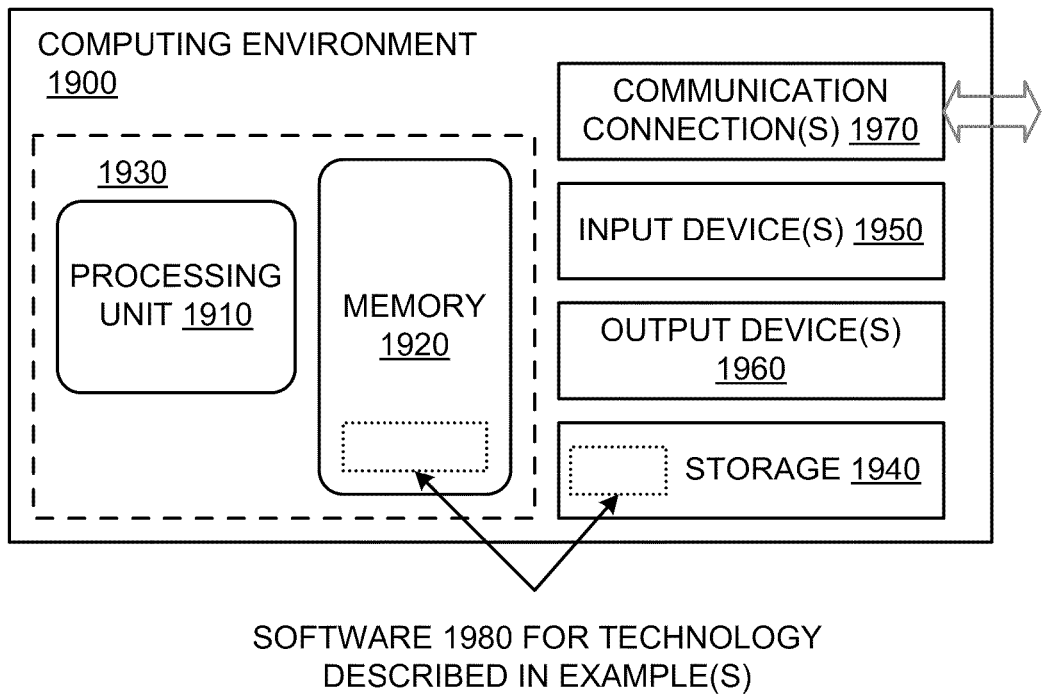
FIG. 19 is a diagram showing a generalized example of a suitable computing environment in which described embodiments, techniques, and technologies may be implemented.

FIG. 19 illustrates a generalized example of a suitable computing environment 1900 in which described embodiments, techniques, and technologies may be implemented. The computing environment 1900 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 19, the computing environment 1900 includes at least one central processing unit 1910 and memory 1920. In FIG. 19, this most basic configuration 1930 is included within a dashed line. The central processing unit 1910 executes computer-executable instructions and may be a real or a virtual processor. In a multi-processing system, multiple processing units execute computer-executable instructions to increase processing power and as such, multiple processors can be running simultaneously. The memory 1920 may be volatile memory (e.g., registers, cache, RAM), non-volatile memory (e.g., ROM, EEPROM, flash memory, etc.), or some combination of the two. The memory 1920 stores software 1980 that can, for example, implement the technologies described herein. A computing environment may have additional features. For example, the computing environment 1900 includes storage 1940, one or more input devices 1950, one or more output devices 1960, and one or more communication connections 1970. An interconnection mechanism (not shown) such as a bus, a controller, or a network, interconnects the components of the computing environment 1900. Typically, operating system software (not shown) provides an operating environment for other software executing in the computing environment 1900, and coordinates activities of the components of the computing environment 1900.

The storage 1940 may be removable or non-removable, and includes magnetic disks, magnetic tapes or cassettes, CD-ROMs, CD-RWs, DVDs, Blu-ray discs or any other medium which can be used to store information and which can be accessed within the computing environment 1900. The storage 1940 stores instructions for the software 1980, which can implement technologies described herein.

The input device(s) 1950 may be a touch input device, such as a keyboard, keypad, mouse, pen, touchscreen, or trackball, microphone or other audio input device, video camera or other video input device, a scanning device, or another device, that provides input to the computing environment 1900. The output device(s) 1960 may be a display, printer, speaker, CD- or DVD-writer, or another device that provides output from the computing environment 1900.

The communication connection(s) 1970 enable communication over a communication medium (e.g., a connecting network) to another computing entity. The communication medium conveys information such as computer-executable instructions or other data in a modulated data signal.

Computer-readable media are any available media that can be accessed within a computing environment 1900. By way of example, and not limitation, with the computing environment 1900, computer-readable media include memory 1920, storage 1940, communication media (not shown), and combinations of any of the above.

Alternatives

Any of the methods described herein can be performed via one or more computer-readable media (e.g., storage media)

having computer-executable instructions for performing such methods. Operation can be fully automatic, semi-automatic, or involve manual intervention.

The technologies of any example described herein can be combined with the technologies of any one or more other examples described herein.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system configured to authenticate services on a push notification framework (PNF), a method comprising:
   receiving, by a PNF server, a request from one or more servers implementing a service to connect with the PNF to authenticate the service;
   providing, by the PNF server, to the service an authenticated mode on the PNF, the authenticated mode requiring registration of the service with the PNF;
   providing, by the PNF server, to the service an unauthenticated mode on the PNF, the unauthenticated mode allowing unregistered use of the PNF;
   receiving, by the PNF server, identifying information provided by the service, wherein the identifying information comprises a certificate for the service;
   selecting, by the PNF server, between the authenticated mode and the unauthenticated mode for the service based on the identifying information provided by the service; and
   based at least in part on the selected mode, providing, by the PNF server, subscription information to the service that permits the service to send push notifications to one or more client devices over a network,
   wherein:
      an authenticated service communicates with the PNF server via a secure data transmission protocol and its authorization is controlled by the PNF server, and
      an unauthenticated service communicates with the PNF server via an un-secured data transmission protocol and is regulated by the PNF server by throttling notification flow from the service.

2. The method of claim 1 wherein the certificate for the service comprises a subject name, the method further comprising:
   registering a service name for the service; and
   validating the service name with the certificate's subject name as part of authentication that confirms registration with the push notification framework.

3. The method of claim 1 wherein the identifying information provided by the service further comprises a service name, the method further comprising:
   looking up the service name to determine whether the service is registered with the push notification framework.

4. The method of claim 1 wherein the selecting comprises selecting the authenticated mode, and wherein the subscription information comprises an HTTPs endpoint.

5. The method of claim 1 wherein the selecting comprises selecting the unauthenticated mode, and wherein the subscription information comprises a front-end HTTP endpoint.

6. The method of claim 1 further comprising selecting between an authenticated third-party service sub-mode and an authenticated internal service sub-mode, wherein the subscription information depends at least in part on the selected sub-mode.

7. The method of claim 6, wherein the subscription information is a front-end HTTPs endpoint if authenticated third-party service sub-mode is selected, or a back-end HTTP endpoint if authenticated internal service sub-mode is selected.

8. In a computer system configured to authenticate services on a push notification framework (PNF), a method comprising:
   receiving, by a PNF server, subscription request information from a client device, the subscription request information identifying a service operable to send push notifications over a network to the client device, the service being implemented on one or more servers;
   based at least in part on the subscription request information, selecting, by the PNF server, between an unauthenticated communication mode and one or more authenticated communication modes for the service on the PNF, the authenticated mode requiring registration of the service with the PNF and the unauthenticated mode allowing unregistered use of the PNF; and
   providing, by the PNF server, a subscription token to the client device, the subscription token comprising endpoint information corresponding to the selected communication mode;
   wherein the endpoint information facilitates sending of push notifications from the service to the client device via the PNF;
   wherein the one or more authenticated communication modes for the service are authenticated on the PNF based on identifying information provided by the service, the identifying information comprising a certificate for the service;
   wherein an authenticated service communicates with the PNF server via a secure data transmission protocol and its authorization is controlled by the PNF server, and
   wherein an unauthenticated service communicates with the PNF server via an un-secured data transmission protocol and is regulated by the PNF server by throttling notification flow from the service.

9. The method of claim 8 wherein the selected communication mode is the unauthenticated mode, the method further comprising:
   monitoring volume of push notifications sent by the service;
   determining whether the volume of push notifications sent by the service exceeds a threshold; and
   if the threshold is exceeded, preventing subsequent push notifications from being sent to the client device.

10. The method of claim 9 wherein the threshold is associated with a time period.

11. The method of claim 9 wherein the preventing of subsequent notifications from being sent comprises invalidating the subscription token.

12. The method of claim 9 wherein the endpoint information comprises an IP address for a front-end HTTP endpoint.

13. The method of claim 8 wherein the service is a third-party authenticated service, wherein the selected communication mode is a third-party authenticated communication mode, and wherein the endpoint information comprises an IP address for a front-end HTTPS endpoint.

14. The method of claim 8 wherein the service is a first-party authenticated service, wherein the selected communication mode is a first-party authenticated communication mode, and wherein the endpoint information comprises an IP address for a private HTTP endpoint that is not accessible by third-party services.

15. The method of claim 8 wherein the providing the subscription token to the client device comprises sending the subscription token to a push notification client stack on the client device.

16. In a computer system configured to authenticate services on a push notification framework (PNF), a method comprising:
   receiving, by a PNF server, a request from a service operable to send push notifications to one or more mobile client devices via the PNF server to connect with the PNF server to authenticate the service, the service being implemented on one or more servers;
   receiving, by the PNF server, a push notification message from the service;
   determining, by the PNF server, whether the service is an authenticated service or an unauthenticated service based on identifying information provided by the service, wherein the identifying information comprises a certificate for the service;
   for an authenticated service, determining, by the PNF server, whether the service is a first-party service or a third-party service;
   selecting, by the PNF server, between an unauthenticated communication mode, an authenticated third-party communication mode, and an authenticated first-party communication mode based on the determining, the authenticated modes requiring registration of the service with the PNF and the unauthenticated mode allowing unregistered use of the PNF; and
   based at least in part on the selected communication mode, determining, by the PNF server, whether to throttle push notifications from the service,
   wherein:
      an authenticated service communicates with the PNF server via a secure data transmission protocol and its authorization is controlled by the PNF server, and
      an unauthenticated service communicates with the PNF server via an un-secured data transmission protocol and is regulated by the PNF server by throttling notification flow from the service.

17. The method of claim 16 wherein the push notification message comprises an HTTP POST request containing a push notification.

18. The method of claim 16 wherein the push notification message comprises a subscription token, the method further comprising:
   as part of an authorization process, validating that a service name in the token is associated with a subscription that the subscription token points to.

19. The method of claim 18 wherein the subscription token comprises an IP address indicating an endpoint at the push notification framework server to which the push notification message can be sent.

* * * * *